(12) United States Patent
Zhao et al.

(10) Patent No.: US 12,075,050 B2
(45) Date of Patent: Aug. 27, 2024

(54) IMAGE DECODING METHOD AND DEVICE THEREFOR

(71) Applicant: LG Electronics Inc., Seoul (KR)

(72) Inventors: Jie Zhao, Seoul (KR); Seethal Paluri, Seoul (KR); Seunghwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 164 days.

(21) Appl. No.: 17/629,597

(22) PCT Filed: Aug. 20, 2020

(86) PCT No.: PCT/KR2020/011086
§ 371 (c)(1),
(2) Date: Jan. 24, 2022

(87) PCT Pub. No.: WO2021/034117
PCT Pub. Date: Feb. 25, 2021

(65) Prior Publication Data
US 2022/0286678 A1    Sep. 8, 2022

Related U.S. Application Data

(60) Provisional application No. 62/890,602, filed on Aug. 22, 2019.

(51) Int. Cl.
*H04N 19/124*    (2014.01)
*H04N 19/176*    (2014.01)
(Continued)

(52) U.S. Cl.
CPC ......... *H04N 19/124* (2014.11); *H04N 19/176* (2014.11); *H04N 19/18* (2014.11);
(Continued)

(58) Field of Classification Search
None
See application file for complete search history.

(56) References Cited

U.S. PATENT DOCUMENTS

2014/0140416 A1*   5/2014   Yamazaki ............ H04N 19/14
                                                         375/240.25
2019/0068977 A1    2/2019   Zhang et al.
(Continued)

FOREIGN PATENT DOCUMENTS

KR    20160035604    3/2016
KR    20180099614    9/2018
(Continued)

OTHER PUBLICATIONS

Heng et al., "AHG16: Changing cu_qp_delta signalling to facilitate VDPU-level processing," JVET-O0046-v1, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.
(Continued)

*Primary Examiner* — Talha M Nawaz
(74) *Attorney, Agent, or Firm* — Fish & Richardson P.C.

(57) ABSTRACT

A method by which a decoding device decodes an image, according to the present document, comprises the steps of: acquiring image information; and generating a reconstruction picture on the basis of the image information.

4 Claims, 18 Drawing Sheets

(a) Chroma QP map (CuQpOffset$_{chroma}$ = -9)

(b) Chroma QP map (CuQpOffset$_{chroma}$ = 2)

(51) Int. Cl.
*H04N 19/18*    (2014.01)
*H04N 19/186*   (2014.01)
*H04N 19/50*    (2014.01)
*H04N 19/61*    (2014.01)
*H04N 19/70*    (2014.01)
*H04N 19/96*    (2014.01)

(52) U.S. Cl.
CPC ........... *H04N 19/186* (2014.11); *H04N 19/50* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 2019/0208204 A1 | 7/2019 | Tourapis et al. | |
| 2020/0021811 A1* | 1/2020 | Nguyen | H04N 19/126 |
| 2020/0322602 A1* | 10/2020 | Huang | H04N 19/174 |
| 2021/0321098 A1* | 10/2021 | Chuang | H04N 19/176 |
| 2022/0109849 A1* | 4/2022 | Xiu | H04N 19/70 |

FOREIGN PATENT DOCUMENTS

| | | |
|---|---|---|
| KR | 20190022629 | 3/2019 |
| KR | 20190093681 | 8/2019 |
| WO | WO2013152007 | 10/2013 |

OTHER PUBLICATIONS

Bross et al., "Versatile Video Coding (Draft 6)," JVET-O2001-vE, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

Chen et al., "Algorithm description for Versatile Video Coding and Test Model 5 (VTM 5)," JVET-N1002-v2, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 76 pages.

* cited by examiner

FIG. 11

(a) Luma QP map (b) Chroma QP map

FIG. 12

| 29 | 29 | 18 |

(a) Chroma QP map
(CuQpOffset$_{chroma}$ = -9)

| 40 | 40 | 29 |

(b) Chroma QP map
(CuQpOffset$_{chroma}$ = 2)

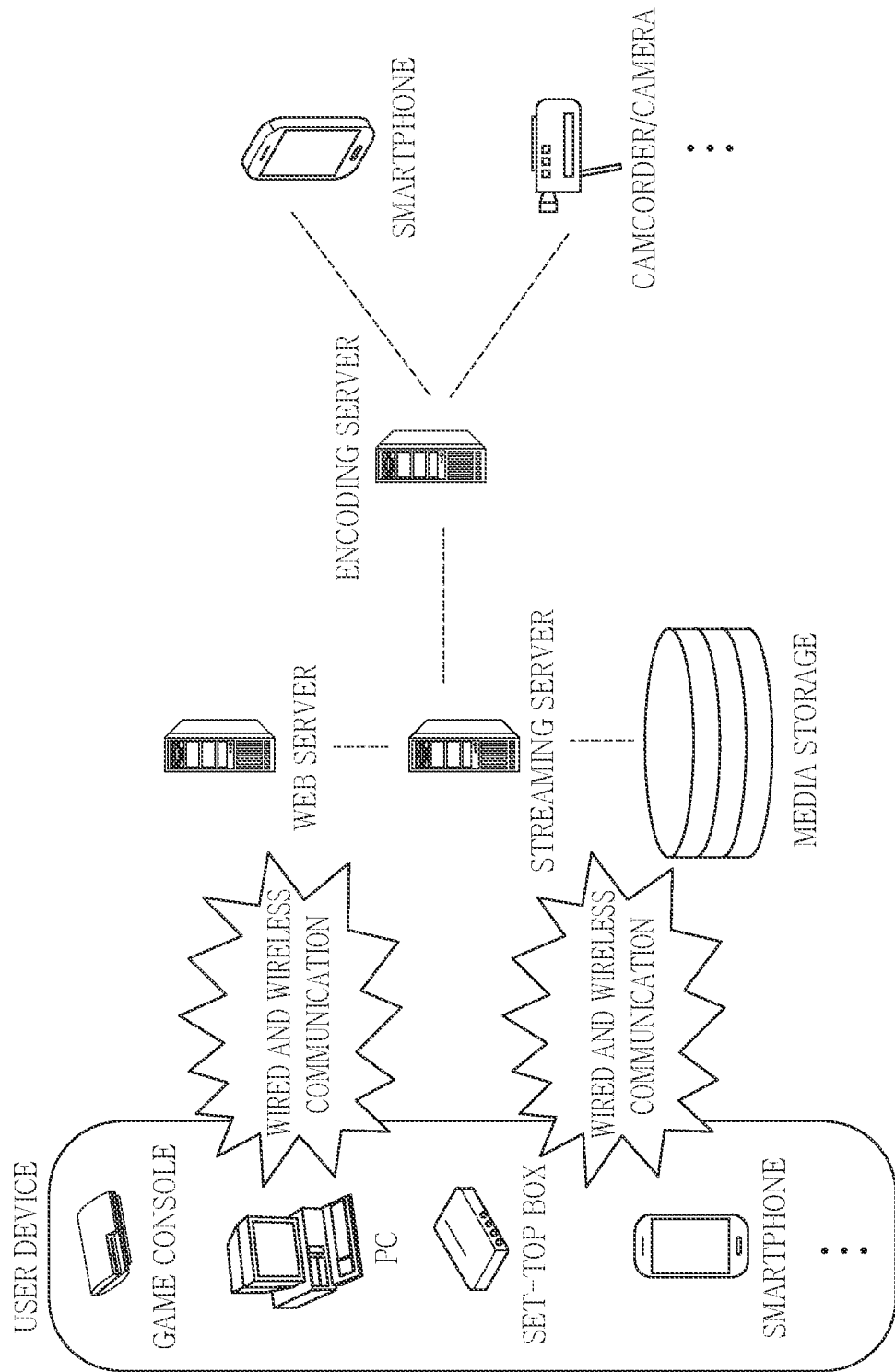

IMAGE DECODING METHOD AND DEVICE THEREFOR

CROSS-REFERENCE TO RELATED APPLICATIONS

This application is a National Stage application under 35 U.S.C. § 371 of International Application No. PCT/KR2020/011086, filed on Aug. 20, 2020, which claims the benefit of U.S. Provisional Application No. 62/890,602, filed on Aug. 22, 2019. The disclosures of the prior applications are incorporated by reference in their entirety.

BACKGROUND OF DISCLOSURE

Field of the Disclosure

This document relates to image coding technology, and more particularly, to an image decoding method for coding CU level chroma quantization parameter offset related information in an image coding system, and an apparatus for the image decoding method.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and apparatus for increasing data coding efficiency of deriving a quantization parameter for a chroma component.

According to an embodiment of this document, an image decoding method performed by a decoding apparatus is provided. The method includes obtaining image information, and generating a reconstructed picture based on the image information, wherein the obtaining the image information process comprises, obtaining prediction information and residual information for a current chroma block, and obtaining Coding Unit (CU) chroma Quantization Parameter (QP) offset related information for the current chroma block based on a tree type and a size of the current chroma block, wherein the CU chroma QP offset related information includes a CU chroma QP offset flag and a CU chroma QP offset index for the current chroma block.

According to another embodiment of this document, a decoding apparatus for performing image decoding is provided. The decoding apparatus includes an entropy decoder configured to obtain image information, and a residual processor configured to generate a reconstructed picture based on the image information, wherein the entropy decoder obtains prediction information and residual information for a current chroma block, and obtains Coding Unit (CU) chroma Quantization Parameter (QP) offset related information for the current chroma block based on a tree type and a size of the current chroma block, wherein the CU chroma QP offset related information includes a CU chroma QP offset flag and a CU chroma QP offset index for the current chroma block.

According to still another embodiment of this document, a video encoding method which is performed by an encoding apparatus is provided. The method includes deriving prediction samples and residual samples for a current chroma block, generating a reconstructed picture based on the prediction samples and the residual samples and encoding image information, wherein the encoding the image information process comprises, generating prediction information for the current chroma block, generating Coding Unit (CU) chroma Quantization Parameter (QP) offset related information for the current chroma block based on a tree type and a size of the current chroma block, deriving a chroma QP for the current chroma block based on the CU chroma QP offset related information, deriving transform coefficients for the current chroma block by quantizing the residual samples based on the chroma QP, generating residual information for the transform coefficients, and encoding image information including the CU chroma QP offset related information, the prediction information and the residual information, wherein the CU chroma QP offset related information includes a CU chroma QP offset flag and a CU chroma QP offset index for the current chroma block.

According to still another embodiment of this document, a video encoding apparatus is provided. The encoding apparatus includes a residual processor configured to derive prediction samples and residual samples for a current chroma block, an adder configured to generate a reconstructed picture based on the prediction samples and the residual samples and an entropy encoder configured to encode image information, wherein the entropy encoder generates prediction information for the current chroma block, generates Coding Unit (CU) chroma Quantization Parameter (QP) offset related information for the current chroma block based on a tree type and a size of the current chroma block, derives a chroma QP for the current chroma block based on the CU chroma QP offset related information, derives transform coefficients for the current chroma block by quantizing the residual samples based on the chroma QP, generates residual information for the transform coefficients, and encodes image information including the CU chroma QP offset related information, the prediction information and the residual information, wherein the CU chroma QP offset related information includes a CU chroma QP offset flag and a CU chroma QP offset index for the current chroma block.

According to still another embodiment of this document, there is provided a computer-readable digital storage medium which stores a bitstream including image information that causes a decoding apparatus to perform an image decoding method. In the computer-readable storage medium, the image decoding method includes obtaining image information, and generating a reconstructed picture based on the image information, wherein the obtaining the image information process comprises, obtaining prediction information and residual information for a current chroma block, and obtaining Coding Unit (CU) chroma Quantization Parameter (QP) offset related information for the current chroma block based on a tree type and a size of the current chroma block, wherein the CU chroma QP offset related information includes a CU chroma QP offset flag and a CU chroma QP offset index for the current chroma block.

According to this document, even if the first transform block in the current chroma block does not include a non-zero transform coefficient level, and when at least one of the width and height of the current chroma block is greater than a specific size, information on the CU chroma QP offset can be signaled, and, thereby, it is possible to reduce the cost of configuring the decoding apparatus.

According to this document, even if the first transform block in the current chroma block does not include a non-zero transform coefficient level, information about the CU chroma QP offset may be signaled in the transform unit syntax of the first transform block based on the size and tree type of the current chroma block, and, thereby, it is possible to reduce the buffer requirement of the decoding apparatus and to reduce the cost of configuring the decoding apparatus.

BRIEF DESCRIPTION OF THE DRAWINGS

FIG. 11 represents an example of a QP map for a luma block and a chroma block when a single tree is used.

FIG. 12 represents an example of a QP map for a chroma block when a dual tree is used.

FIG. 18 illustrates a structural diagram of a contents streaming system to which the present disclosure is applied.

DESCRIPTION OF EMBODIMENTS

Figure 1:
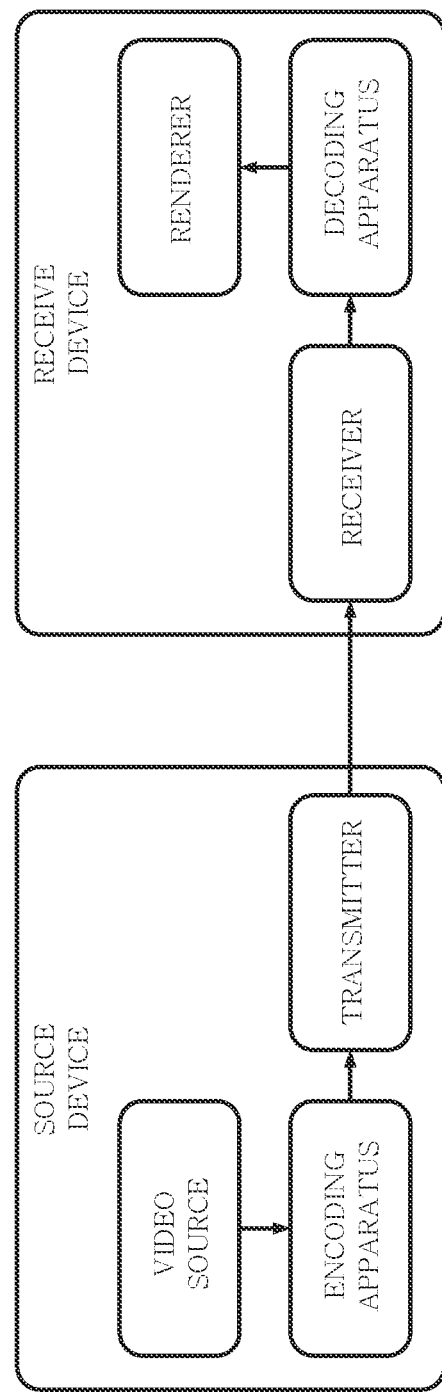
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
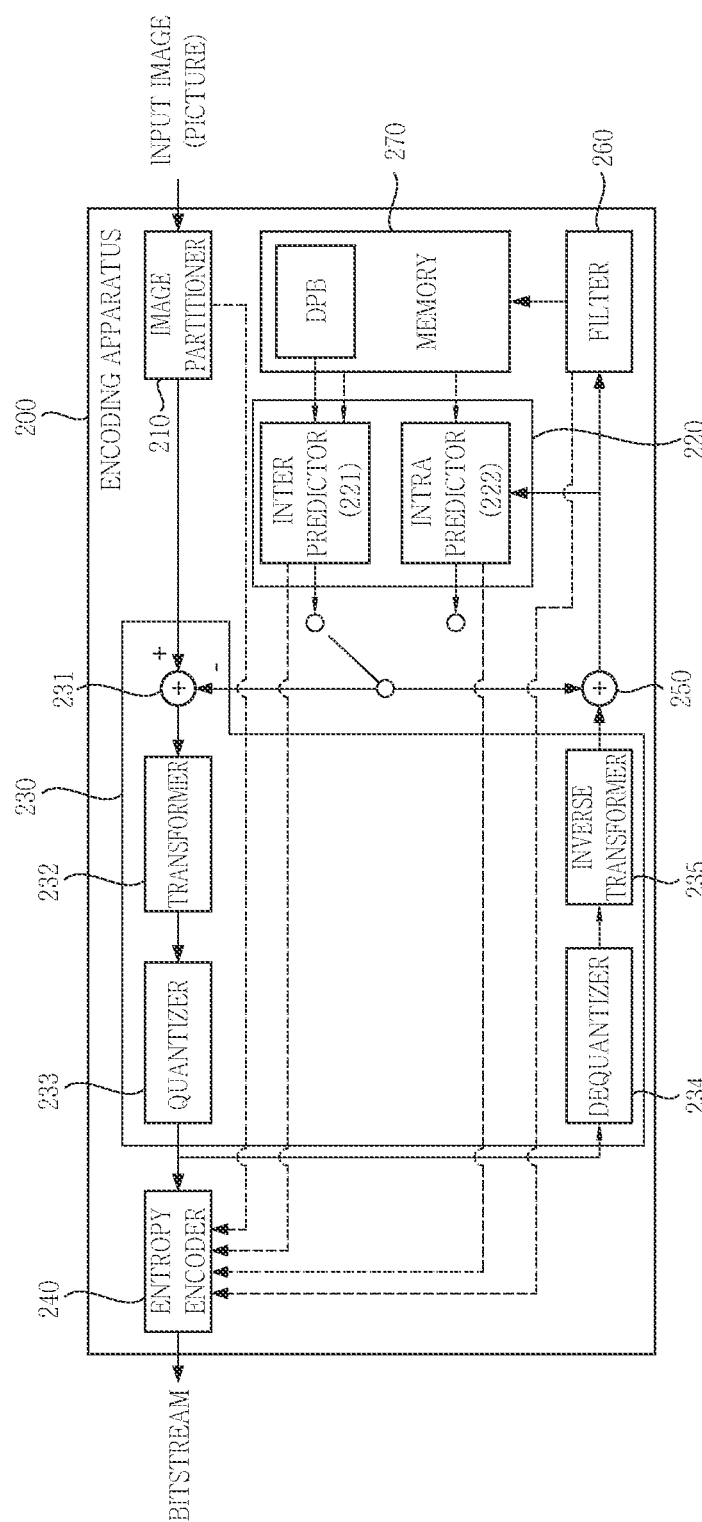
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
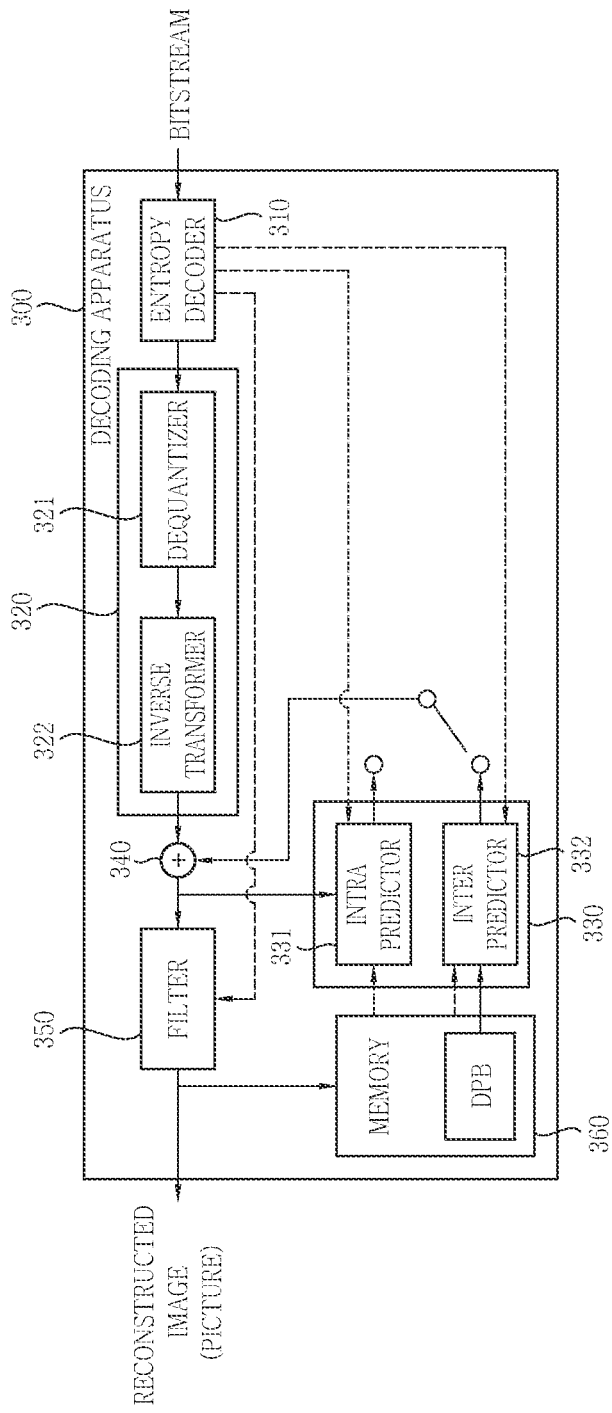
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

Figure 4:
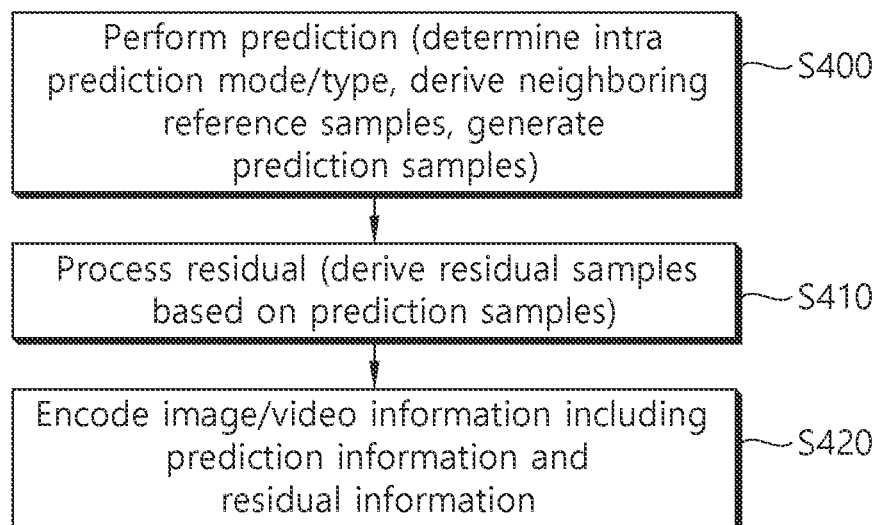
FIG. 4 illustrates an example of an intra prediction-based video/image encoding method.

FIG. 4 illustrates an example of an intra prediction-based video/image encoding method.

Referring to FIG. 4, the encoding device performs intra prediction on the current block S400. The encoding device derives an intra prediction mode/type for the current block, derives neighboring reference samples of the current block, generates prediction samples in the current block based on the intra prediction mode/type and the neighboring reference samples. Here, the intra prediction mode/type determination, neighboring reference samples derivation, and prediction samples generation procedures may be performed simultaneously, or one procedure may be performed before another procedure. The encoding device may determine a mode/type applied to the current block from among a plurality of intra prediction modes/types. The encoding device may compare RD costs for the intra prediction mode/types and determine an optimal intra prediction mode/type for the current block.

Meanwhile, the encoding device may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction samples S410. The encoding device may compare the prediction samples in the original samples of the current block based on the phase and derive the residual samples.

The encoding device may encode image information including information on the intra prediction (prediction information) and residual information on the residual samples S420. The prediction information may include the intra prediction mode information and the intra prediction type information. The encoding device may output encoded image information in the form of a bitstream. The output bitstream may be transmitted to the decoding device through a storage medium or a network.

The residual information may include residual coding syntax, which will be described later. The encoding device may transform/quantize the residual samples to derive quantized transform coefficients. The residual information may include information on the quantized transform coefficients.

Meanwhile, as described above, the encoding device may generate a reconstructed picture (including reconstructed samples and reconstructed blocks). To this end, the encoding device may derive (modified) residual samples by performing inverse quantization/inverse transformation on the quantized transform coefficients again. The reason for performing the inverse quantization/inverse transformation again after transforming/quantizing the residual samples in this way is to derive the same residual samples as the residual samples derived in the decoding device as described above. The encoding device may generate a reconstructed block including reconstructed samples for the current block based on the prediction samples and the (modified) residual samples. A reconstructed picture for the current picture may be generated based on the reconstructed block. As described above, an in-loop filtering procedure may be further applied to the reconstructed picture.

Figure 5:
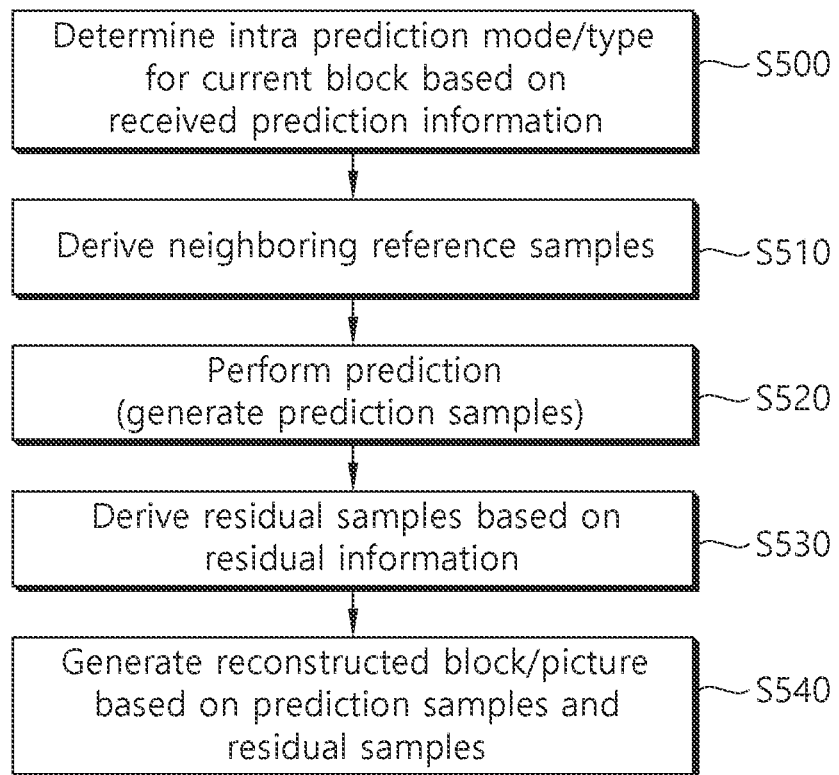
FIG. 5 illustrates an example of an intra prediction-based video/image encoding method.

FIG. 5 illustrates an example of an intra prediction-based video/image encoding method.

The decoding device may perform an operation corresponding to the operation performed by the encoding apparatus.

Prediction information and residual information may be obtained from a bitstream. Residual samples for the current block may be derived based on the residual information. Specifically, transform coefficients may be derived by performing inverse quantization based on the quantized transform coefficients derived based on the residual information, residual samples for the current block may be derived by performing inverse transform on the transform coefficients.

Specifically, the decoding device may derive the intra prediction mode/type for the current block based on the received prediction information (intra prediction mode/type information) S500. The decoding device may derive neighboring reference samples of the current block S510. The decoding device generates prediction samples in the current block based on the intra prediction mode/type and the neighboring reference samples S520. In this case, the decoding device may perform a prediction sample filtering procedure. The Predictive sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information S530. The decoding device may generate reconstructed samples for the current block based on the prediction samples and the residual samples, and may derive a reconstructed block including the reconstructed samples S540. A reconstructed picture for the current picture may be generated based on the reconstructed block. As described above, an in-loop filtering procedure may be further applied to the reconstructed picture.

The intra prediction mode information may include, for example, flag information (ex. intra_luma_mpm_flag) indicating whether MPM (most probable mode) is applied to the current block or whether a remaining mode is applied, and, when the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information includes remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

Also, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag) or ISP type information indicating a split type of subpartitions when the ISP is applied (ex. intra_subpartitions_split_flag). Also, the intra prediction type information may include a MIP flag representing whether matrix-based intra prediction (MIP) is applied to the current block.

The intra prediction mode information and/or the intra prediction type information may be encoded/decoded through a coding method described in the present disclosure. For example, the intra prediction mode information and/or the intra prediction type information may be encoded/decoded through entropy coding (eg, CABAC, CAVLC).

Figure 6:
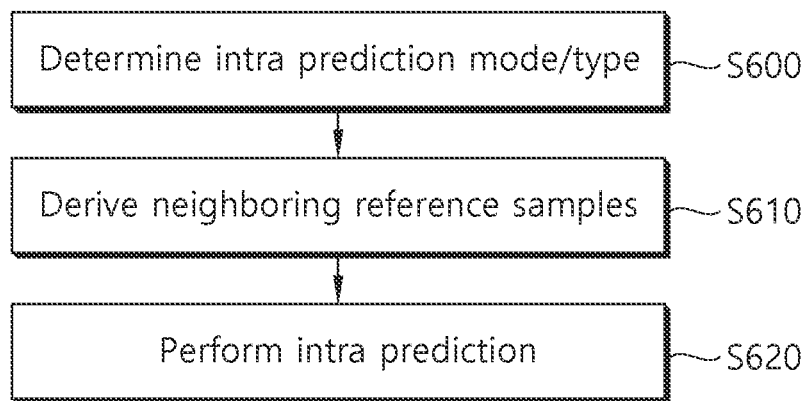
FIG. 6 schematically shows an intra prediction procedure.

FIG. 6 schematically shows an intra prediction procedure.

Referring to FIG. 6, as described above, the intra prediction procedure may include a step of determinating an intra prediction mode/type, a step of deriving neighboring reference samples, and a step of performing intra prediction (generating a prediction sample). The intra prediction procedure may be performed by the encoding device and the decoding device as described above. In the present disclosure, a coding device may include the encoding device and/or the decoding device.

Referring to FIG. 6, the coding device determines an intra prediction mode/type S600.

The encoding device may determine an intra prediction mode/type applied to the current block from among the various intra prediction modes/types described above, and may generate prediction related information. The prediction related information may include intra prediction mode information representing an intra prediction mode applied to the current block and/or intra prediction type information representing an intra prediction type applied to the current block. The decoding device may determine an intra prediction mode/type applied to the current block based on the prediction related information.

The intra prediction mode information may include, for example, flag information (ex. intra_luma_mpm_flag) representing whether a most probable mode (MPM) is applied to the current block or a remaining mode is applied, and the When the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information may further include remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag) or ISP type information indicating a split type of subpartitions when the ISP is applied (ex. intra_subpartitions_split_flag). Also, the intra prediction type information may include a MIP flag representing whether matrix-based intra prediction (MIP) is applied to the current block.

For example, when intra prediction is applied, an intra prediction mode applied to the current block may be determined using an intra prediction mode of a neighboring block. For example, the coding device may select one of most probable mode (MPM) candidates in the MPM list derived based on additional candidate modes and/or an intra prediction mode of the neighboring block (eg, the left and/or top neighboring block) of the current block, or select one of the remaining intra prediction modes not included in the MPM candidates (and planar mode) based on the MPM remainder information (remaining intra prediction mode information). The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planner flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (eg, intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList.

When the MIP is applied to the current block, a separate mpm flag (ex. intra_mip_mpm_flag) for the MIP, an mpm index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

The coding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoding device may perform prediction based on various intra prediction modes, and may determine an optimal intra prediction mode based on rate-distortion optimization (RDO) based thereon. In this case, the encoding device may determine the optimal intra prediction mode by using only the MPM candidates and planar mode configured in the MPM list, or by further using the remaining intra prediction modes as well as the MPM candidates and planar mode configured in the MPM list. Specifically, for example, if the intra prediction type of the current block is a specific type (ex. LIP, MRL, or ISP) other than the normal intra prediction type, the encoding device may determine the optimal intra prediction mode by considering only the MPM candidates and the planar mode as intra prediction mode candidates for the current block. That is, in this case, the intra prediction mode for the current block may be determined only from among the MPM candidates and the planar mode, and in this case, encoding/signaling of the mpm flag may not be performed. In this case, the decoding device may infer that the mpm flag is 1 without separately signaling the mpm flag.

Meanwhile, in general, when the intra prediction mode of the current block is not the planar mode and is one of the MPM candidates in the MPM list, the encoding device generates an mpm index (mpm idx) indicating one of the MPM candidates. when the intra prediction mode of the current block is not included in the MPM list, the encoding device generates MPM reminder information (remaining intra prediction mode information) indicating the same mode as the intra prediction mode of the current block among the remaining intra prediction modes not included in the MPM list (and planar mode). The MPM reminder information may include, for example, an intra_luma_mpm_remainder syntax element.

The decoding device obtains intra prediction mode information from the bitstream. As described above, the intra prediction mode information may include at least one of an MPM flag, a not planner flag, an MPM index, and MPM remaster information (remaining intra prediction mode information). The decoding device may construct the MPM list. The MPM list is constructed the same as the MPM list constructed in the encoding device. That is, the MPM list may include intra prediction modes of neighboring blocks, or may further include specific intra prediction modes according to a predetermined method.

The decoding device may determine the intra prediction mode of the current block based on the MPM list and the intra prediction mode information. For example, when the value of the MPM flag is 1, the decoding device may derive the planar mode as the intra prediction mode of the current block (based on not planar flag) or derive the candidate indicated by the MPM index from among the MPM candidates in the MPM list as the intra prediction mode of the current block. Here, the MPM candidates may represent only candidates included in the MPM list, or may include not only candidates included in the MPM list but also the planar mode applicable when the value of the MPM flag is 1.

As another example, when the value of the MPM flag is 0, the decoding device may derive an intra prediction mode indicated by the remaining intra prediction mode information (which may be referred to as mpm remainder information) among the remaining intra prediction modes not included in the MPM list and the planner mode as the intra prediction mode of the current block. Meanwhile, as another example, when the intra prediction type of the current block is a specific type (ex. LIP, MRL or ISP, etc.), the decoding device may derive a candidate indicated by the MPM flag in the planar mode or the MPM list as the intra prediction mode of the current block without parsing/decoding/checking the MPM flag.

The coding device derives neighboring reference samples of the current block S610. When intra prediction is applied to the current block, the neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

On the other hand, when the MRL is applied (that is, when the value of the MRL index is greater than 0), the neighboring reference samples may be located on lines 1 to 2 instead of line 0 adjacent to the current block on the left/top side, and in this case, the number of the neighboring reference samples may be further increased. Meanwhile, when the ISP is applied, the neighboring reference samples may be derived in units of sub-partitions.

The coding device derives prediction samples by performing intra prediction on the current block S620. The coding device may derive the prediction samples based on the intra prediction mode/type and the neighboring samples. The coding device may derive a reference sample according to an intra prediction mode of the current block among neighboring reference samples of the current block, and may derive a prediction sample of the current block based on the reference sample.

Meanwhile, when inter prediction is applied, the predictor of the encoding apparatus/decoding apparatus may derive prediction samples by performing inter prediction in units of blocks. The inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

A video/image encoding process based on inter prediction may schematically include, for example, the following.

Figure 7:
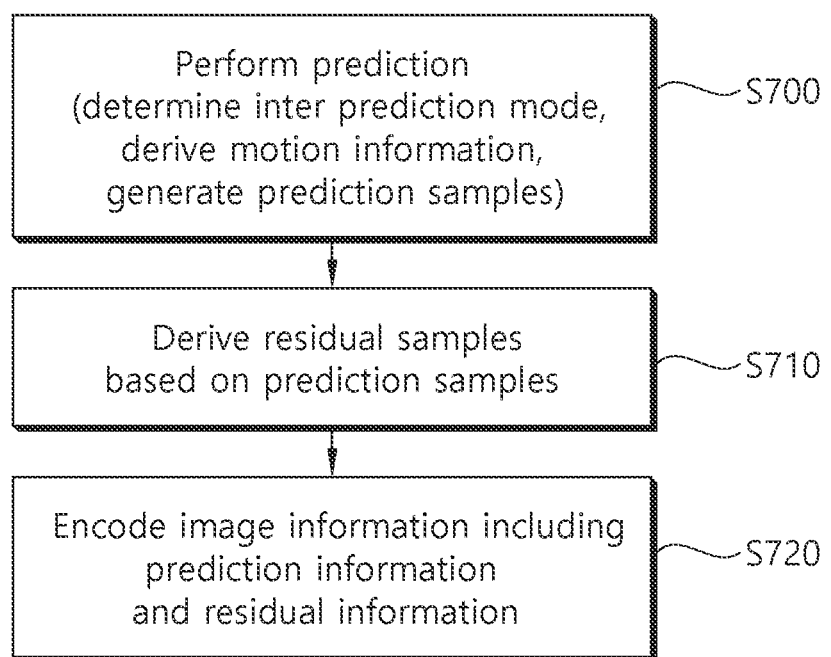
FIG. 7 illustrates an example of an inter prediction-based video/image encoding method.

FIG. 7 illustrates an example of an inter prediction-based video/image encoding method.

The encoding apparatus performs the inter prediction for the current block (S700). The encoding apparatus may derive the inter prediction mode and the motion information of the current block and generate the prediction samples of the current block. Here, an inter prediction mode determining process, a motion information deriving process, and a generation process of the prediction samples may be simultaneously performed and any one process may be performed earlier than other process. For example, the inter-prediction unit of the encoding apparatus may include a prediction mode determination unit, a motion information derivation unit, and a prediction sample derivation unit, and the prediction mode determination unit may determine the prediction mode for the current block, the motion information derivation unit may derive the motion information of the current block, and the prediction sample derivation unit may derive the prediction samples of the current block. For example, the inter-prediction unit of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding apparatus may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding apparatus. The motion information of the current block may be derived by using the motion information of the selected merge candidate.

As another example, when an (A)MVP mode is applied to the current block, the encoding apparatus may configure an (A)MVP candidate list to be described below and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S710). The encoding apparatus may derive the residual samples by comparing original samples and the prediction samples of the current block.

The encoding apparatus encodes image information including prediction information and residual information (S720). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding apparatus or transferred to the decoding apparatus via the network.

Meanwhile, as described above, the encoding apparatus may generate a reconstructed picture (including reconstructed samples and reconstructed blocks) based on the reference samples and the residual samples. This is to derive the same prediction result as that performed by the decoding apparatus, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering process may be further applied to the reconstruction picture as described above.

A video/image decoding process based on inter prediction may schematically include, for example, the following.

Figure 8:
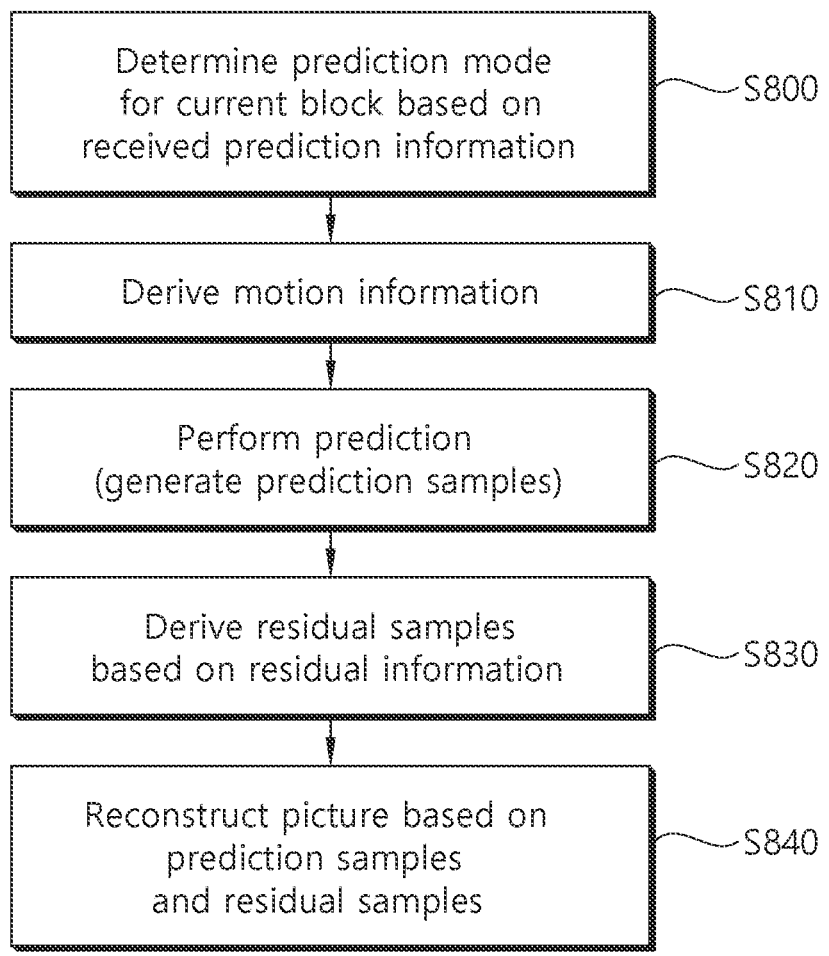
FIG. 8 illustrates an example of an inter prediction-based video/image decoding method.

FIG. 8 illustrates an example of an inter prediction-based video/image decoding method.

Referring to FIG. 8, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S800). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes to be described below.

The decoding apparatus derives the motion information of the current block based on the determined inter prediction mode (S810). For example, when the skip mode or the merge mode is applied to the current block, the decoding apparatus may configure the merge candidate list to be described below and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list to be described below and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, as described below, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S820). In this case, the reference picture may be derived based on the reference picture index of the current block and the prediction samples of the current block may be derived by using the samples of the reference block indicated by the motion vector of the current block on the reference picture. In this case, in some cases, a predicted sample filtering procedure for all or some of the prediction samples of the current block may be further performed.

For example, the inter-prediction unit of the decoding apparatus may include a prediction mode determination unit, a motion information derivation unit, and a prediction sample derivation unit, and the prediction mode determination unit may determine the prediction mode for the current block based on the received prediction mode information, the motion information derivation unit may derive the motion information (the motion vector and/or reference picture index) of the current block based on the information on the received motion information, and the prediction sample derivation unit may derive the predicted samples of the current block.

The decoding apparatus generates the residual samples for the current block based on the received residual information (S830). The decoding apparatus may generate the reconstruction samples for the current block based on the prediction samples and the residual samples and generate the reconstruction picture based on the generated reconstruction samples (S840). Thereafter, the in-loop filtering procedure may be further applied to the reconstruction picture as described above.

Figure 9:
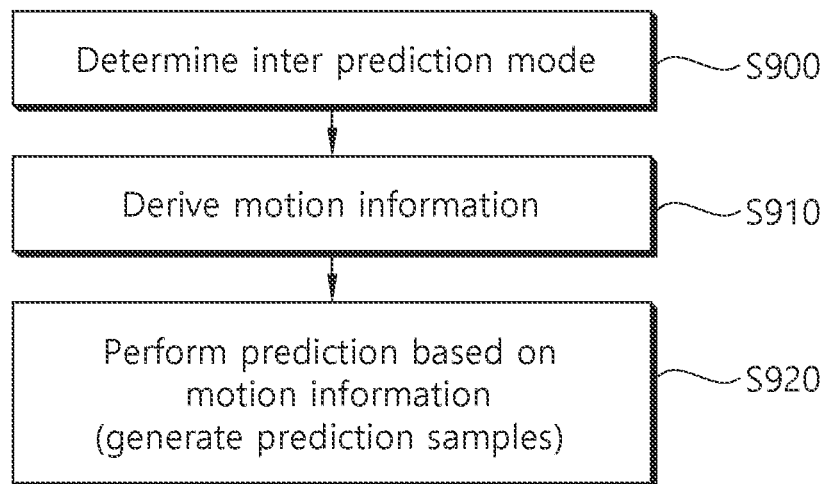
FIG. 9 schematically shows an inter prediction procedure.

FIG. 9 schematically shows an inter prediction procedure.

Referring to FIG. 9, as described above, the inter prediction process may include an inter prediction mode determination step, a motion information derivation step according to the determined prediction mode, and a prediction processing (prediction sample generation) step based on the derived motion information. The inter prediction process may be performed by the encoding apparatus and the decoding apparatus as described above. In this document, a coding device may include the encoding apparatus and/or the decoding apparatus.

Referring to FIG. 9, the coding apparatus determines an inter prediction mode for the current block (S900). Various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

The coding apparatus derives motion information for the current block (S910). Motion information derivation may be derived based on the inter prediction mode.

The coding apparatus may perform inter prediction using motion information of the current block. The encoding apparatus may derive optimal motion information for the current block through a motion estimation procedure. For example, the encoding apparatus may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding apparatus according to various methods based on the inter prediction mode.

The coding apparatus performs inter prediction based on motion information for the current block (S920). The coding apparatus may derive prediction sample(s) for the current block based on the motion information. A current block including prediction samples may be referred to as a predicted block.

Meanwhile, as described above, the quantizer of the encoding apparatus may derive quantized transform coefficients by applying quantization to transform coefficients. The dequantizer of the encoding apparatus or the dequantizer of the decoding apparatus may derive transform coefficients by applying dequantization to the quantized transform coefficients.

In general, in video/image coding, a quantization ratio may be changed, and a compression rate may be adjusted using the changed quantization ratio. In an implementation aspect, a quantization parameter (QP) may be used instead of directly using the quantization ratio by considering complexity. For example, quantization parameters having integer values of 0 to 63 may be used, and each quantization parameter value may correspond to an actual quantization ratio. Furthermore, for example, a quantization parameter QPY for a luma component and a quantization parameter QPC for a chroma component may be different configured.

In a quantization process, a transform coefficient C may be an input, a quantization ratio (Qstep) may be divided, and a quantized transform coefficient C' may be obtained based on the quantization ratio. In this case, the quantization ratio may be produced in an integer form by multiplying the quantization ratio by a scale by considering calculation complexity, and a shift operation may be performed by a value corresponding to a scale value. A quantization scale may be derived based on the product of the quantization ratio and the scale value. That is, the quantization scale may be derived based on the QP. For example, the quantization scale may be applied to the transform coefficient C', and a quantized transform coefficient C' may be derived based on a result of the application.

A dequantization process is a reverse process of the quantization process. In this process, a quantized transform coefficient C' may be multiplied by a quantization ratio (Qstep), and a reconstructed transform coefficient C'' may be obtained based on the result of the multiplication. In this case, a level scale may be derived based on a quantization parameter, the level scale may be applied to the quantized transform coefficient C', and a reconstructed transform coefficient C'' may be derived. The reconstructed transform coefficient C'' may have some difference from the first transform coefficient C due to a loss in the transform and/or quantization process. Accordingly, dequantization is performed in the encoding apparatus as in the decoding apparatus.

Meanwhile, an adaptive frequency weighting quantization technology for adjusting quantization strength depending on a frequency may be applied. The adaptive frequency weighting quantization technology is a method of differently applying quantization strength for each frequency. In the adaptive frequency weighting quantization, quantization strength for each frequency may be differently applied using a predefined quantization scaling matrix. That is, the aforementioned quantization/dequantization process may be performed based on the quantization scaling matrix. For example, in order to generate the size of a current block and/or a residual signal of the current block, a different quantization scaling matrix may be used depending on whether a prediction mode applied to the current block is inter prediction or intra prediction. The quantization scaling matrix may be called a quantization matrix or a scaling matrix. The quantization scaling matrix may be pre-defined. Furthermore, for frequency adaptive scaling, quantization scale information for each frequency for the quantization scaling matrix may be constructed/encoded in the encoding apparatus and signaled to the decoding apparatus. The quantization scale information for each frequency may be called quantization scaling information. The quantization scale information for each frequency may include scaling list data (scaling_list_data). A (modified) quantization scaling matrix may be derived based on the scaling list data. Furthermore, the quantization scale information for each frequency may include present flag information representing whether the scaling list data is present. Alternatively, if the scaling list data is signaled in a higher level (e.g., SPS), information representing whether the scaling list data is modified in a lower level (e.g., a PPS or a tile group header, etc.) of a higher level, etc. may be further included.

As in the aforementioned contents, quantization/dequantization may be applied to a luma component and a chroma component based on a quantization parameter.

Meanwhile, as for a quantization group in the current video/image coding standard, information about luma QP may be signaled as a delta Qp from the previous QP, and the transmission of the information may be delayed until the first transform unit having a coded coefficient. Specifically, the syntax element cu_qp_delta representing delta QP may be transmitted in the first transform unit (i.e., tu_cbf=1) of a quantization group having a coded coefficient.

Figure 10:
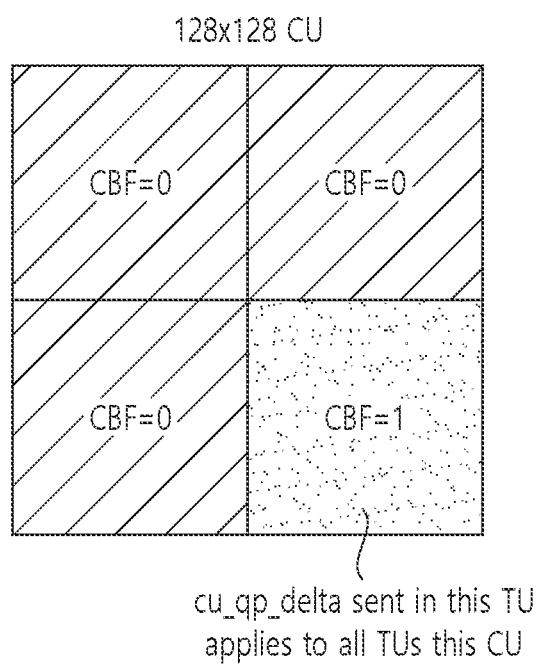
FIG. 10 shows an example in which cu_qp_delta for TUs within a CU having a size of 128×128 are transmitted.

FIG. 10 shows an example in which cu_qp_delta for TUs within a CU having a size of 128×128 are transmitted. As shown in FIG. 10, in the case of a CU of a large size, delta QP may not be transmitted until the last TU in the coding order. However, the delta QP value transmitted for the last TU may be applied to the entire CU.

Additionally, the concept of a 64×64 Virtual Decoder Pipeline Unit (VDPU) may be used in the current video/image coding standard. Particularly, in the current video/image coding standard, structural and syntax elements for maximum transform sizes, luma/chroma syntax interleaving, and the like may be designed so that the decoding apparatus can process blocks of 64×64 size (i.e., VDPU) at one time even in a large CU having a maximum size of 128×128. Using a 64×64 pipeline may enable significant cost reduction of the decoding apparatus, given the buffering requirements of a 128×128 pipeline.

However, the delta QP design in VVC standard draft 5 and earlier standards is not appropriate to the 64×64 pipeline concept. Since a QP value is required for in-loop filtering, the absence of a QP value may mean that the process for previous TUs of the CU cannot be completed.

Specifically, the deblocking filter may need QP to determine filtering thresholds. Therefore, in the VVC standard draft 6, a condition is added to the delta QP signaling. Specifically, in the case of the CU with cbWidth[chType]>64 or cbHeight[chType]>64, a condition may be added to signal delta QP regardless of whether or not the first TU has non-zero coefficients (i.e., coded coefficients).

For example, luma delta QP in VVC standard draft 6 may be signaled as shown in the following table.

Additionally, for example, in VVC standard draft 5, chroma QP control is available only at picture and slice level. For example, the chroma QP may be derived as in the following equation.

$$qPi_{Cb}=\text{Clip3}(-QpBdOffset_C,69,Qp_Y+pps\_cb\_qp\_offset+slice\_cb\_qp\_offset),$$

$$qPi_{Cr}=\text{Clip3}(-QpBdOffset_C,69,Qp_Y+pps\_cr\_qp\_offset+slice\_cr\_qp\_offset),$$

$$qPi_{CbCr}=\text{Clip3}(-QpBdOffset_C,69,Qp_Y+pps\_joint\_cbcr\_qp\_offset+slice\_joint\_cbcr\_qp\_offset) \qquad \text{[Equation 1]}$$

where $Qp_Y$ may denote luma QP; $QpBdOffset_C$ may denote chroma QP range offset; pps_cb_qp_offset, pps_cr_qp_offset, and pps_joint_cbcr_qp_offset may denote PPS level QP offsets for respective chroma components; and slice_cb_qp_offset, slice_cr_qp_offset, and slice_joint_cbcr_qp_offset may denote slice-level QP offsets for respective chroma components. In addition, $Qp'_{Cb}$ may denote a chroma quantization parameter for a chroma Cb component; $Qp'_{Cr}$ may denote a chroma quantization parameter for a chroma Cr component; and $Qp'_{CbCr}$ may denote a chroma quantization parameter for joint Cb-Cr coding.

Further, for example, in VVC standard draft 6, CU level chroma QP control is also applied. For example, the chroma QP may be derived as in the following equation.

$$Qp'_{Cb}=\text{Clip3}(-QpBdOffset_C,63,qP_{Cb}+pps\_cb\_qp\_offset+slice\_cb\_qp\_offset+CuQpOffset_{Cb})+QpBdOffset_C$$

$$Qp'_{Cr}=\text{Clip3}(-QpBdOffset_C,63,qP_{Cr}+pps\_cr\_qp\_offset+slice\_cr\_qp\_offset+CuQpOffset_{Cr})+QpBdOffset_C$$

$$Qp'_{CbCr}=\text{Clip3}(-QpBdOffset_C,63,qP_{CbCr}+pps\_cbcr\_qp\_offset+slice\_cbcr\_qp\_offset+CuQpOffset_{CbCr})+QpBdOffset_C \qquad \text{[Equation 2]}$$

where $CuQpOffset_{Cb}$, $CuQpOffset_{Cr}$, and $CuQpOffset_{CbCr}$ may denote CU level QP offsets for respective chroma components. In addition, $Qp'_{Cb}$ may denote a chroma quantization parameter for a chroma Cb component; $Qp'_{Cr}$ may denote a chroma quantization parameter for a chroma Cr component; and $Qp'_{CbCr}$ may denote a chroma quantization parameter for joint Cb-Cr coding.

Figure 11:
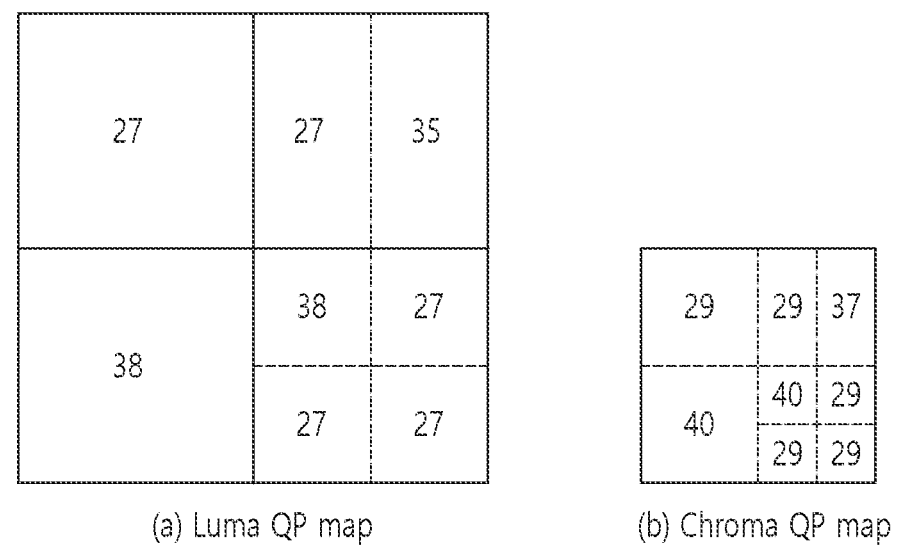

FIG. 11 represents an example of a QP map for a luma block and a chroma block when a single tree is used. CU chroma QPs may be derived as the sum of the luma QP and the signaled chroma QP offset. Referring to FIG. 11, a rectangle represented by a solid line may indicate a quantization group, and a rectangle represented by a dotted line may indicate a CU. Also, for example, referring to FIG. 11, $CuQpOffset_{chroma}$ may be 2. Meanwhile, the tree type of the current block may be divided into a single tree (SINGLE_TREE) or a dual tree (DUAL_TREE) according to whether or not the current luma block and the corresponding current chroma blocks have their separate partition structures. For example, if the current chroma blocks have the same partition structure as the current luma block, it may be represented as a single tree, and if the current chroma blocks have a partition structure different from that of the current luma block, it may be represented as a dual tree. The current block may be a CU or TU.

TABLE 1

```
if( (cbWidth[ chType ] > 64 | | cbHeight[[ chType ] > 64 | | tu_cbf_luma[ x0 ][ y0 ] | | tu_c
bf_cb[ x0 ][ y0 ] | | tu_cbf_cr[ x0 ][ y0 ] ) && treeType != DUAL_TREE_CHROMA ) {
    if( cu_qp_delta_enabled_flag && !IsCuQpDeltaCoded ) {
        cu_qp_delta_abs
        if( cu_qp_delta_abs )
            cu_qp_delta_sign_flag
    }
}
```

FIG. 12 represents an example of a QP map for a chroma block when a dual tree is used. Also, for example, referring to (a) of FIG. 12, CuQpOffset$_{chroma}$ may be −9, and referring to (b) of FIG. 12, CuQpOffset$_{chroma}$ may be 2. When a dual tree is used, a luma CU boundary and a chroma CU boundary may not be aligned. That is, the chroma blocks may have a different partition structure from that of the corresponding luma block. Therefore, for each chroma CU, the chroma QP may be derived as the sum of the co-located luma QP (to the center of the chroma CU) and the signaled chroma QP offset. The correlation between the luma QP and the chroma QP is somewhat maintained, but it may be difficult to predict the control over the chroma QP.

Additionally, in the VVC standard draft 6, the joint CbCr residual coding mode is integrated therein by extending the offset table from 2 QPoffsets per entry to 3 QPoffsets per entry.

Also, for example, the TU syntax of the VVC standard draft 6 may be as shown in the table below.

TABLE 2

| | Descriptor |
|---|---|
| transform_unit( x0, y0, tbWidth, tbHeight, treeType, subTuIndex, chType ) { | |
|   if( ( treeType = = SINGLE_TREE | | treeType = = DUAL_TREE_CHROMA ) && | |
|     ChromaArrayType != 0 ) { | |
|     if( (IntraSubPartitionsSplitType = = ISP_NO_SPLIT && !(cu_sbt_flag && | |
|       ( ( subTuIndex = = 0 && cu_sbt_pos flag) | | | |
|         ( subTuIndex = = 1 && !cu_sbt_pos_flag) ) ) | | | |
|       ( IntraSubPartitionsSplitType != ISP_NO_SPLIT && | |
|       ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE | | treeType = = DUAL_TREE_LUMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) | | | |
|         ( subTuIndex = = 1 && !cu_sbt_pos_flag ) ) && | |
|       ( CuPredMode[ chType ][ x0 ][ y0 ] = = MODE_INTRA | | | |
|       tu_cbf_cb[ x0 ][ y0 ] | | tu_cbf_cr[ x0 ][ y0 ] | | | |
|       CbWidth[ chType ][ x0 ][ y0 ] > MaxTbSizeY | | | |
|       CbHeight[ chType ][ x0 ][ y0 ] > MaxTbSizeY ) ) | | | |
|       ( IntraSubPartitionsSplitType != ISP_NO_SPLIT && | |
|       ( subTuIndex < NumIntraSubPartitions − 1 | | !InferTuCbfLuma ) ) ) | |
|       tu_cbf_luma[ x0 ][ y0 ] | ae(v) |
|     if(IntraSubPartitionsSplitType != ISP_NO_SPLIT ) | |
|       InferTuCbfLuma = InferTuCbfLuma && !tu_cbf_luma[ x0 ][ y0 ] | |
|   } | |
|   if( IntraSubPartitionsSplitType != ISP_NO_SPLIT && | |
|     treeType = = SINGLE_TREE && subTuIndex = = NumIntraSubPartitions − 1 ) ) | |
|     xC = CbPosX[ chType ][ x0 ][ y0 ] | |
|     yC = CbPosY[ chType ][ x0 ][ y0 ] | |
|     wC = CbWidth[ chType ][ x0 ][ y0 ] / SubWidthC | |
|     hC = CbHeight[ chType ][ x0 ][ y0 ] / SubHeightC | |
|   } else | |
|     xC = x0 | |
|     yC = y0 | |
|     wC = tbWidth / SubWidthC | |
|     hC = tbHeight / SubHeightC | |
|   } | |
|   if( ( CbWidth[ chType ][ x0 ][ y0 ] > 64 | | CbHeight[ chType ][ x0 ][ y0 ] > 64 | | | |
|     tu_cbf_luma[ x0 ][ y0 ] | | tu_cbf_cb[ x0 ][ y0 ] | | tu_cbf_cr[ x0 ][ y0 ]) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs) | |
|         cu_qp_delta_sign_flag | ae(v) |
|     } | |
|   } | |
|   if( ( tu_cbf_cb[ x0 ][ y0 ] | | tu_cbf_cr[ x0 ][ y0 ]) { | |
|     if( cu_chroma_qp_offset_enabled_flag && !IsCuChromaQpOffsetCoded) { | |
|       cu_chroma_qp_offset_flag | ae(v) |
|       if( cu_chroma_qp_offset_flag && chroma_qp_offset_list_len_minus1 > 0 ) | |
|         cu_chroma_qp_off_set_idx | ae(v) |
|     } | |
|   } | |
|   if( sps_joint_cbcr_enabled_flag && ( ( CuPredMode[ chType ][ x0 ][ y0 ] = = MODE_INTRA | |
|     && ( tu_cbf_cb[ x0 ][ y0 ] | | tu_cbf_cr[ x0 ][ y0 ] ) ) | | | |
|     ( tu_cbf_cb[ x0 ][ y0 ] && tu_cbf_cr[ x0 ][ y0 ] ) ) ) | |

TABLE 2-continued

|  | Descriptor |
|---|---|
|     tu_joint_cbcr_residual_flag[ x0 ][ y0 ] | ae(v) |
|     if( tu_cbf_luma[ x0 ][ y0 ] && treeType != DUAL_TREE_CHROMA | |
|       && ( tbWidth <= 32 ) && ( tbHeight <= 32 ) | |
|       && ( IntraSubPartitionsSplit[ x0 ][ y0 ] = = ISP_NO_SPLIT ) && (!cu_s | |
| bt_flag ) ) { | |
|       if( sps_transform_skip_enabled_flag && !BdpcmFlag[ x0 ][ y0 ] && | |
|         tbWidth <= MaxTsSize && tbHeight <= MaxTsSize ) | |
|         transform_skip_flag[ x0 ][ y0 ] | ae(v) |
|       if( ( ( CuPredMode[ chType ][ x0 ][ y0 ] = = MODE_INTER && | |
|         sps_explicit_mts_inter_enabled_flag ) | |
|         | | ( CuPredMode[ chType ][ x0 ][ y0 ] = = MODE_INTRA && | |
|         sps_explicit_mts_intra_enabled_flag ) ) && ( !transform_skip_flag[ x0 ] | |
| [ y0 ] ) ) | |
|         tu_mts_idx[ x0 ][ y0 ] | ae(v) |
|     } | |
|     if( tu_cbf_luma[ x0 ][ y0 ] ) { | |
|       if( !transform_skip_flag[ x0 ][ y0 ] ) | |
|         residual_coding( x0, y0, Log2( tbWidth ), Log2( tbHeight ), 0 ) | |
|       else | |
|         residual_ts_coding( x0, y0, Log2( tbWidth ), Log2( tbHeight ), 0 ) | |
|     } | |
|     if( tu_cbf_cb[ x0 ][ y0 ] ) | |
|       residual_coding( xC, yC, Log2( wC ), Log2( hC ), 1 ) | |
|     if( tu_cbf_cr[ x0 ][ y0 ] && | |
|       !( tu_cbf_cb[ x0 ][ y0 ] && tu_joint_cbcr_residual_flag [ x0 ][ y0 ] )) { | |
|       residual_coding( xC, yC, Log2( wC ), Log2( hC ), 2 ) | |
|     } | |
| } | |

The transform coefficient level may be represented as the array TransCoeffLevel[x0][y0][cIdx][xC][yC]. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. Also, the array index cIdx may represent an index for a color component. For example, the value of the array index for the luma component (Y component) may be equal to 0; the value of the array index for the chroma Cb component may be equal to 1; and the value of the array index for the chroma Cr component may be equal to 2. Additionally, the array indices xC and yC may represent the position (xC, yC) of the transform coefficient in the current transform block. Meanwhile, if the value of TransCoeffLevel[x0][y0][cIdx][xC][yC] is not specified, the value may be inferred as being equal to 0.

Also, for example, if the syntax element tu_cbf_cb[x0][y0] is 1, it may represent that one or more non-zero transform coefficient levels are included in the Cb transform block. Here, the array indices x0 and y0 may represent the top-left position (x0, y0) of the considered transform block. When the syntax element tu_cbf_cb[x0][y0] does not exist in the current TU, the value of the syntax element tu_cbf_cb[x0][y0] may be inferred as 0. Additionally, the tu_cbf_cb[x0][y0] may be expressed as tu_cb_coded_flag[x0][y0].

Also, for example, if the syntax element tu_cbf_cr[x0][y0] is 1, it may represent that one or more non-zero transform coefficient levels are included in the Cr transform block. Here, the array indices x0 and y0 may represent the top-left position (x0, y0) of the considered transform block. When the syntax element tu_cbf_cr[x0][y0] does not exist in the current TU, the value of the syntax element tu_cbf_cr[x0][y0] may be inferred as 0. Additionally, the tu_cbf_cr[x0][y0] may be expressed as tu_cr_coded_flag[x0][y0].

Also, for example, if the syntax element tu_cbf_luma[x0][y0] is 1, it may represent that one or more non-zero transform coefficient levels are included in the luma transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. When the syntax element tu_cbf_luma[x0][y0] does not exist in the current TU, the value of the syntax element tu_cbf_luma[x0][y0] may be inferred as follows.

For example, when the value of cu_sbt_flag is 1 and one of the conditions to be described later is true, the value of the syntax element tu_cbf_luma[x0][y0] may be inferred as 0.

When the value of subTuIndex is 0 and the value of cu_sbtpos_flag is 1
    When the value of subTuIndex is 1 and the value of cu_sbtpos_flag is 0

Meanwhile, in other cases, the value of the syntax element tu_cbf_luma[x0][y0] may be inferred as 1. Additionally, the tu_cbf_luma[x0][y0] may be expressed as tu_y_coded_flag[x0][y0].

Also, for example, the syntax element tu_joint_cbcr_residual_flag[x0][y0] may indicate whether or not residual samples for the chroma component Cb and the chroma component Cr are coded with a single transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block.

For example, if the syntax element tu_joint_cbcr_residual_flag[x0][y0] is 1, it may indicate that the transform unit syntax includes a transform coefficient level for a single transform block from which residual samples for the chroma component Cb and the chroma component Cr are derived. Also, for example, if the syntax element tu_joint_cbcr_residual_flag[x0][y0] is 0, it may indicate that the transform coefficient levels of the chroma components are coded as represented by the syntax elements tu_cbf_cb[x0][y0] and tu_cbf_cr[x0][y0]. When the syntax element tu_joint_cbcr_residual_flag[x0][y0] does not exist, the value of the syntax element tu_joint_cbcr_residual_flag[x0][y0] may be inferred as 0.

For example, according to tu_joint_cbcr_residual_flag [x0][y0], tu_cbf_cb[x0][y0], and tu_cbf_cr[x0][y0], the variable TuCResMode[x0][y0] may be derived as follows.

For example, when the value of tu_joint_cbcr_residual_flag[x0][y0] is 0, the variable TuCResMode[x0][y0] may be set to 0.

If it does not correspond to the above-described case and tu_cbf_cb[x0][y0] is 1 and tu_cbf_cr[x0][y0] is 0, the variable TuCResMode[x0][y0] may be set to 1.

If it does not correspond to the above-described cases and tu_cbf_cb[x0][y0] is 1, the variable TuCResMode[x0][y0] may be set to 2.

If it does not correspond to the above-described cases, the variable TuCResMode[x0][y0] may be set to 3.

Also, for example, the syntax element cu_qp_delta abs may represent an absolute value of a difference CuQpDeltaVal between a quantization parameter of the current coding unit and its prediction.

Also, for example, the syntax element cu_qp_delta sign flag may represent the sign of CuQpDeltaVal as follows.

For example, when cu_qp_delta_sign_flag is 0, the corresponding CuQpDeltaVal may have a positive value.

If it does not correspond to the above-described case (i.e., when cu_qp_delta_sign_flag is 1), the corresponding CuQpDeltaVal may have a negative value.

Meanwhile, when the syntax element cu_qp_delta_sign_flag does not exist, the value of the syntax element cu_qp_delta_sign_flag may be inferred as 0.

Also, for example, when cu_qp_delta abs is present, the variable IsCuQpDeltaCoded and the variable CuQpDeltaVal may be derived as the following equation.

IsCuQpDeltaCoded=1

CuQpDeltaVal=cu_qp_delta_abs*(1−2*cu_qp_delta_sign_flag)     [Equation 3]

The value of CuQpDeltaVal may be in the range of −(32+QpBdOffsetY/2) to +(31+QpBdOffsetY/2).

Also, for example, if the syntax element cu_chroma_qp_offset_flag is present and equal to 1, the syntax element cu_chroma_qp_offset_flag may indicate that the entry of cb_qp_offset_list[ ] is used to determine the value of $CuQpOffset_{Cb}$, that the corresponding entry of cr_qp_offset_list[ ] is used to determine the value of $CuQpOffset_{Cr}$, and that the corresponding entry in joint_cbcr_qp_offset_list [ ] is used to determine the value of $CuQpOffset_{CbCr}$. Also, for example, if the syntax element cu_chroma_qp_offset_flag is 0, the syntax element cu_chroma_qp_offset_flag may indicate that cb_qp_offset_list[ ], cr_qp_offset_list[ ], and joint_cbcr_qp_offset_list[ ] are not used to determine the values of $CuQpOffset_{Cb}$, $CuQpOffset_{Cr}$, and $CuQpOffset_{CbCr}$.

Also, for example, when the syntax element cu_chroma_qp_offset_idx is present, the syntax element cu_chroma_qp_offset_idx may represent indices in cb_qp_offset_list[ ], cr_qp_offset_list[ ] and joint_cbcr_qp_offset_list[ ] used to determine the values of $CuQpOffset_{Cb}$, $CuQpOffset_{Cr}$ and $CuQpOffset_{CbCr}$. When the syntax element cu_chroma_qp_offset_idx is present, the value of the syntax element cu_chroma_qp_offset_idx may be in the range from 0 to chroma_qp_offset_list_len_minus1. When the syntax element cu_chroma_qp_offset_idx is not present, the syntax element cu_chroma_qp_offset_idx may be inferred as 0.

Further, for example, when the syntax element cu_chroma_qp_offset_flag is present, the following description may be applied.

If cu_chroma_qp_offset_flag is 1, values of $CuQpOffset_{Cb}$, $CuQpOffset_{Cr}$, and $CuQpOffset_{CbCr}$ may be derived as shown in the following equation.

$CuQpOffset_{Cb}$=cb_qp_offset_list[cu_chroma_qp_offset_idx]

$CuQpOffset_{Cr}$=cr_qp_offset_list[cu_chroma_qp_offset_idx]

$CuQpOffset_{CbCr}$=joint_cbcr_qp_offset_list[cu_chroma_qp_offset_idx]     [Equation 4]

If it does not correspond to the above-described case (i.e., when cu_chroma_qp_offset_flag is 0), $CuQpOffset_{Cb}$, $CuQpOffset_{Cr}$, and $CuQpOffset_{CbCr}$ may be set to 0.

Additionally, for example, the syntax element transform_skip_flag[x0][y0] may indicate whether or not a transform is applied to the luma transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. For example, if transform_skip_flag[x0][y0] is 1, it may indicate that no transform is applied to the luma transform block. Also, for example, if transform_skip_flag [x0][y0] is 0, it may indicate that whether or not a transform is applied to the luma transform block may be determined based on another syntax element.

Additionally, for example, when the transform_skip_flag[x0][y0] does not exist, the value of the transform_skip_flag[x0][y0] may be inferred as follows.

For example, if BdpcmFlag[x0][y0] is 1, the transform_skip_flag[x0][y0] may be inferred as 1.

If it does not correspond to the above-described case (i.e., for example, when BdpcmFlag[x0][y0] is 0), the transform_skip_flag[x0][y0] may be inferred as 0.

Additionally, for example, the syntax element tu_mts_idx [x0][y0] may represent transform kernels applied to residual samples in a horizontal direction and a vertical direction of an associated luma transform block. Here, the array indices x0 and y0 may represent the position (x0, y0) of the top-left luma sample of the corresponding transform block for the top-left luma sample of the picture. That is, when the position of the top-left luma sample of the picture is (0, 0), the array indices x0 and y0 may represent the position (x0, y0) of the top-left luma sample of the corresponding transform block. Also, for example, when the syntax element tu_mts_idx[x0][y0] is not present, the syntax element tu_mts_idx[x0][y0] may be inferred as 0.

Figure 13:
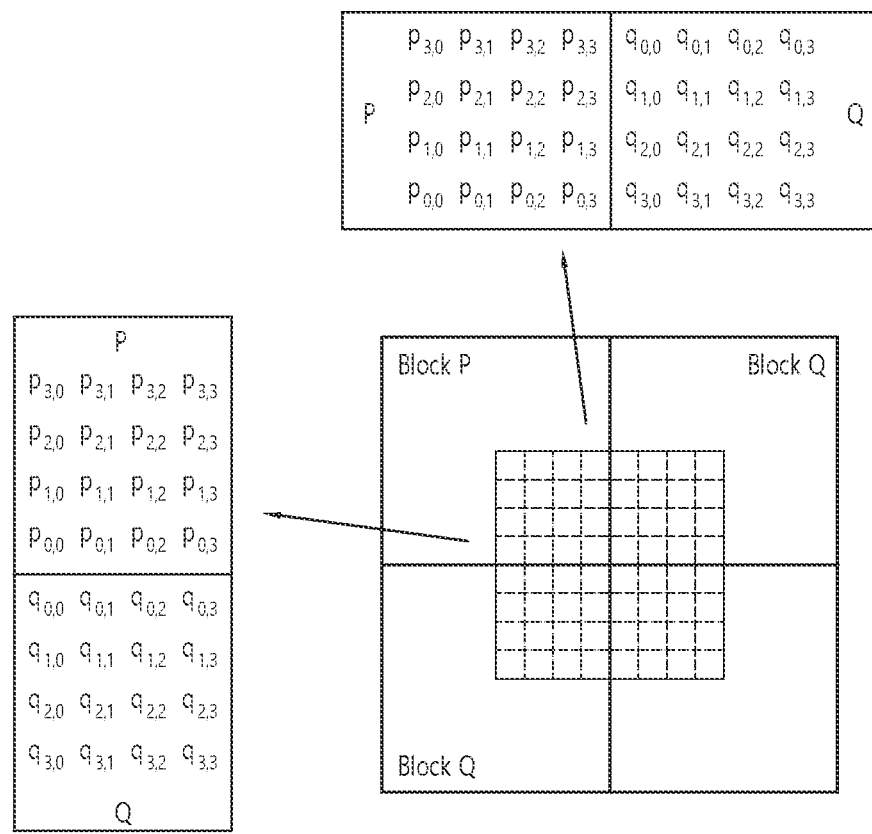
FIG. 13 exemplarily represents a sample position for deblocking filtering.

FIG. 13 exemplarily represents a sample position for deblocking filtering.

Meanwhile, the chroma QP may be used for deblocking filtering of the chroma component. However, for example, slice level and CU level QP adjustment may not be considered for chroma QP used for deblocking filtering. For example, the chroma QP used for deblocking filtering may be derived based on the corresponding luma QP and the picture level chroma QP offset cQpPicOffset. Here, for example, cQpPicOffset representing the picture level chroma QP offset may be derived as pps_cb_qp_offset if cIdx is 1, and may be derived as pps_cr_qp_offset if cIdx is not 1.

Additionally, for example, the variable $Qp_Q$ may be set equal to the $Qp_Y$ value of the coding unit including the coding block including the sample $q_{0,0}$ shown in FIG. 6, and the variable $Qp_P$ may be set equal to the $Qp_Y$ value of the coding unit including the coding block including the sample $p_{0,0}$ shown in FIG. 6.

than 64, the CU chroma QP offset (when the chroma QP offset for the chroma CU is present) may be signaled regardless of whether or not the first TU has a non-zero coefficient. Here, the cbWidth and the cbHeight may represent a CU width and a CU height of a luma element or a chroma element according to a channel type or a tree type. For example, in the case of an image of the YUV 4:4:4 format, since a chroma CU with a width or a height greater than 64 may be generated, a VDPU level process is possible through the method proposed in this embodiment, and a QP may be enable when the VDPU is parsed.

For example, the transform unit syntax according to the present embodiment may be as shown in the following table.

TABLE 3

| | Descriptor |
|---|---|
| transform_unit( x0, y0, tbWidth, tbHeight, treeType, subTuIndex, chType ) { | |
| ... | |
|   if( ( CbWidth[ chType ][ x0 ][ y0 ] > 64 \|\| CbHeight[ chType ][ x0 ][ y0 ] > 64 \|\| | |
|     tu_cbf_luma[ x0 ][ y0 ] \|\| tu_cbf_cb[ x0 ][ y0 ] tu_cbf_cr[ x0 ][ y0 ] ) && | |
|     treeType != DUAL_TREE_CHROMA ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |
|   if( ( CbWidth[ chType ][ x0 ][ y0 ] > 64 \|\| CbHeight[ chType ][ x0 ][ y0 ] > 64 \|\| tu_cbf_cb[ x0 ][ y0 ] tu_cbf_cr[ x0 ][ y0 ] ) { | |
|     if( cu_chroma_qp_offset_enabled_flag && !IsCuChromaQpOffsetCoded ) { | |
|       cu_chroma_qp_offset_flag | ae(v) |
|       if( cu_chroma_qp_offset_flag && chroma_qp_offset_list_len_minus1 > 0) | |
|         cu_chroma_qp_offset_idx | ae(v) |
|     } | |
|   } | |
| ... | |
| } | |

Thereafter, the chroma QP $Qp_C$ used for deblocking filtering may be derived as in the following equation.

$$qPi = Clip3(0, 63, ((Qp_Q + Qp_P + 1) >> 1) + cQpPicOffset)$$

$$Qp_C = ChromaQpTable[cIdx-1][qPi] \quad \text{[Equation 5]}$$

Meanwhile, there may be some disadvantages in the design related to chroma QP for deblocking filtering of the existing VVC standard. Since VVC supports dual trees, there may be a big difference between luma QP and chroma QP of a CU because the partitions of the luma block and the chroma block are different. In addition, the VVC standard supports YUV 4:2:2 format and YUV 4:4:4 format as well as YUV 4:2:0 format. Here, in the case of the YUV 4:4:4 format, if an inaccurate chroma QP is used for deblocking filtering, it may have a greater effect, and a visual artifact may occur.

Accordingly, this document proposes an efficient chroma QP signaling scheme as in the embodiments to be described later.

In one embodiment, chroma QP offset signaling supporting a VDPU level process is proposed. In this embodiment, for a chroma CU with cbWidth or cbHeight greater than 64, the CU chroma QP offset (when the chroma QP offset for the chroma CU is present) may be signaled regardless of whether or not a non-zero chroma CBF is included in the first TU. That is, according to this embodiment, when the cbWidth or cbHeight of the current chroma CU is greater Referring to Table 3, "CbWidth[chType][x0][y0]>64||CbHeight[chType][x0][y0]>64||" may be added to the signaling condition of CU chroma QP offset related information. That is, referring to Table 3, when CbWidth[chType][x0] [y0] is greater than 64 or CbHeight[chType][x0][y0] is greater than 64, CU chroma QP offset related information may be signaled. The CU chroma QP offset related information may include a syntax element cu_chroma_qp_offset_flag and/or a syntax element cu_chroma_qp_offset_idx.

For example, if the syntax element cu_chroma_qp_offset_flag is present and equal to 1, the syntax element cu_chroma_qp_offset_flag may indicate that the entry of cb_qp_offset_list[ ] is used to determine the value of $CuQpOffset_{Cb}$, that the corresponding entry of cr_qp_offset_list[ ] is used to determine the value of $CuQpOffset_{Cr}$, and that the corresponding entry in joint_cbcr_qp_offset_list[ ] is used to determine the value of $CuQpOffset_{CbCr}$. Also, for example, if the syntax element cu_chroma_qp_offset_flag is 0, the syntax element cu_chroma_qp_offset_flag may indicate that cb_qp_offset_list[ ], cr_qp_offset_list[ ], and joint_cbcr_qp_offset_list[ ] are not used to determine the values of $CuQpOffset_{Cb}$, $CuQpOffset_{Cr}$, and $CuQpOffset_{CbCr}$.

Also, for example, when the syntax element cu_chroma_qp_offset_idx is present, the syntax element cu_chroma_qp_offset_idx may represent indices in cb_qp_offset_list[ ], cr_qp_offset_list[ ] and joint_cbcr_qp_offset_list[ ] used to determine the values of $CuQpOffset_{Cb}$, CuQpOffset$_{Cr}$ and CuQpOffset$_{CbCr}$. When the syntax element cu_chroma_qp_offset_idx is present, the value of the syntax element cu_chroma_qp_offset_idx may be in the range from 0 to chroma_qp_offset_list_len_minus1. When the syntax element cu_chroma_qp_offset_idx is not present, the syntax element cu_chroma_qp_offset_idx may be inferred as 0.

In addition, as an embodiment, this document proposes a method of adding a condition to CU level chroma QP offset signaling for a dual tree. This embodiment proposes a method of modifying the availability condition of the existing syntax for the CU chroma QP offset flag in order to avoid unnecessary signaling. For example, according to the present embodiment, when the coding tree is dual tree luma (DUAL_TREE_LUMA), that is, when the coding tree is neither single tree (SINGLE_TREE) nor dual tree chroma (DUAL_TREE_CHROMA), CU chroma QP Offset related information may not be signaled.

For example, the transform unit syntax according to the present embodiment may be as shown in the following table.

TABLE 4

| | Descriptor |
|---|---|
| transform_unit( x0, y0, tbWidth, tbHeight, treeType, subTuIndex, chType ) { <br> ... <br>   if( ( CbWidth[ chType ][ x0 ][ y0 ] > 64 \|\| CbHeight[ chType ][ x0 ][ y0 ] > 64 \|\| <br>     tu_cbf_luma[ x0 ][ y0 ] \|\| tu_cbf_cb[ x0 ][ y0 ] tu_cbf_cr[ x0 ][ y0 ] ) && <br>     treeType != DUAL_TREE_CHROMA ) { <br>     if( cu_qp_delta_enabled_flag && !IsCuQpDeltaCoded ) { <br>       cu_qp_delta_abs | ae(v) |
|       if( cu_qp_delta_abs ) <br>         cu_qp_delta_sign_flag | ae(v) |
|     } <br>   } <br>   if((tu_cbf_cb[ x0 ][ y0 ] \|\| tu_cbf_cr[ x0 ][ y0 ] ) &&treeType! = DUAL_TREE_LUMA) { <br>     if( cu_chroma_qp_offset_enabled_flag && !IsCuChromaQpOffsetCoded ) { <br>       cu_chroma_qp_offset_flag | ae(v) |
|       if( cu_chroma_qp_offset_flag && chroma_qp_offset_list_len_minus1 > 0 ) <br>         cu_chroma_qp_offset_idx | ae(v) |
|     } <br>   } <br> ... <br> } | |

Referring to Table 4, "&& treeType!=DUAL_TREE_LUMA" may be added to the signaling condition of CU chroma QP offset related information. That is, referring to Table 4, CU chroma QP offset related information may be signaled only when the coding tree is not DUAL_TREE_LUMA. The CU chroma QP offset related information may include a syntax element cu_chroma_qp_offset_flag and/or a syntax element cu_chroma_qp_offset_idx.

Additionally, as an embodiment, this document proposes another method of adding a condition to CU level chroma QP offset signaling. This embodiment proposes a method of modifying the availability condition of the existing syntax for the CU chroma QP offset flag in order to avoid unnecessary signaling. For example, this embodiment proposes a method of modifying the availability condition of an existing syntax by combining the signaling conditions of the above-described embodiments.

For example, the transform unit syntax according to the present embodiment may be as shown in the following table.

TABLE 5

| | Descriptor |
|---|---|
| transform_unit( x0, y0, tbWidth, tbHeight, treeType, subTuIndex, chType ) { <br> ... <br>   if( ( CbWidth[ chType ][ x0 ][ y0 ] > 64 \|\| CbHeight[ chType ][ x0 ][ y0 ] > 64 \|\| <br>     tu_cb_luma[ x0 ][ y0 ] \|\| tu_cbf_cb[ x0 ][ y0 ] \|\| tu_cbf_cr[ x0 ][ y0 ] ) && <br>     treeType != DUAL_TREE_CHROMA-) { <br>     if( cu_qp_delta_enabled_flag && !IsCuQpDeltaCoded ) { | |

TABLE 5-continued

| | Descriptor |
|---|---|
|    cu_qp_delta_abs | ae(v) |
|    if( cu_qp_delta_abs ) | |
|      cu_qp_delta_sign_flag | ae(v) |
|  } | |
| } | |
|  if((CbWidth[ chType ][ x0 ][ y0 ] > 64 | | CbHeight[ chType ][ x0 ][ y 0 ] > 64 | | tu_cbf_cb[ x0 ][ y0 ] | | tu_cbf_cr[ x0 ][f y0 ] ) && treeType != DUAL_TREE_LUMA) { | |
|    if( cu_chroma_qp_offset_enabled_flag && !IsCuChromaQpOffsetCoded ) { | |
|      cu_chroma_qp_offset_flag | ae(v) |
|      if( cu_chroma_qp_offset_flag && chroma_qp_offset_list_len_minus1 > 0 ) | |
|        cu_chroma_qp_offset_idx | ae(v) |
|    } | |
|  } | |
| ... | |
| } | |

Referring to Table 5, "CbWidth[chType][x0][y0]>64|| CbHeight[chType][x0][y0]>64||" and "&& treeType!=DUAL_TREE_LUMA" may be added to the signaling condition of CU chroma QP offset related information. That is, referring to Table 5, if the coding tree is not DUAL_TREE_LUMA and CbWidth[chType][x0][y0] is greater than 64, or CbHeight[chType][x0][y0] is greater than 64, CU chroma QP offset related information may be signaled. Accordingly, when the coding tree is DUAL_TREE_LUMA, CU chroma QP offset related information may not be signaled. The CU chroma QP offset related information may include a syntax element cu_chroma_qp_offset_flag and/or a syntax element cu_chroma_qp_offset_idx.

Additionally, this document proposes a method of using CU level chroma QP for deblocking filtering. This embodiment proposes a method of integrating slice-level chroma QP and/or CU-level chroma QP into chroma QP expressed as QpC and used in the chroma deblocking process. The deblocking parameter may be determined based on the derived QpC.

For example, the variable QpC may be derived based on Qp of neighboring CUs as shown in the following equation.

$$QpC = Clip3(0, 63, ((Qp_{Q'cIdx} + Qp_{P'cIdx} + 1) >> 1)) \quad \text{[Equation 6]}$$

Here, $Qp_{Q'cIdx}$ may represent a chroma QP of a CU P adjacent to a block boundary to be deblocking filtered, and $Qp_{P'cIdx}$ may represent a chroma QP of a CU Q adjacent to a block boundary to be deblocking filtered. Also, cIdx may be an index representing a chroma component. For example, cIdx may represent a chroma Cb component, a chroma Cr component, or a chroma CbCr component. $Qp_{Q'cIdx}$ and $Qp_{P'cIdx}$ may be values for which slice level QP adjustment and CU level QP adjustment have already been considered.

Alternatively, for example, the variable QpC may first be derived based on the luma QP of the neighboring CU P and the neighboring CU Q, and then the slice level QP adjustment and the CU level QP adjustment may be added. For example, the variable QpC may be derived as follows.

$$qP_i = Clip3(0, 63, ((Qp_Q + Qp_P + 1) >> 1) + cQpPicOffset)$$

$$QpC = ChromaQpTable[cIdx-1][qPi] + SliceQp\\Offset_{cIdx} + ((CuQpOffset_{PcIdx} + CuQp\\Offset_{PcIdx} + 1) >> 1) \quad \text{[Equation 7]}$$

Here, $CuQpOffset_{PcIdx}$ may represent the CuQPOffset of the element cIdx of the neighboring CU P, and $CuQpOffset_{QcIdx}$ may represent the CuQPOffset of the element cIdx of the neighboring CU Q.

Figure 14:
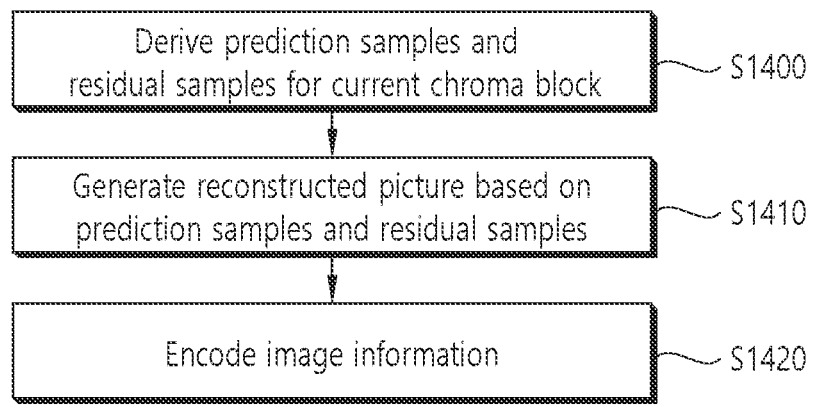
FIG. 14 schematically shows an image encoding method by an encoding apparatus according to the present document.

FIG. 14 schematically shows an image encoding method by an encoding apparatus according to the present document. The method disclosed in FIG. 14 may be performed by the encoding apparatus disclosed in FIG. 2. Specifically, for example, S1400 in FIG. 14 may be performed by the predictor and the residual processor of the encoding apparatus, S1410 may be performed by the adder of the encoding apparatus, and S1420 may be performed by the entropy encoder of the encoding apparatus.

The encoding apparatus derives prediction samples and residual samples for a current chroma block (S1400). The encoding apparatus may derive prediction samples and residual samples for a current chroma block.

For example, the encoding apparatus may derive prediction samples for the current chroma block based on a prediction mode. In this case, various prediction methods disclosed in this document, such as inter prediction or intra prediction, may be applied.

For example, the encoding apparatus may determine whether to perform inter prediction or intra prediction on the current chroma block, and may determine specific inter prediction mode or specific intra prediction mode based on RD cost. According to the determined mode, the encoding apparatus may derive prediction samples for the current chroma block.

Then, for example, the encoding apparatus may derive the residual samples through the subtraction of the prediction samples and the original samples for the current chroma block.

The encoding apparatus generates a reconstructed picture based on the prediction samples and the residual samples (S1410). For example, the encoding apparatus may generate reconstructed samples and/or a reconstructed picture through addition of the prediction samples and the residual samples.

After this, as described above, an in-loop filtering procedure such as an ALF procedure, SAO and/or deblocking filtering may be applied as needed to the reconstructed samples in order to improve subjective/objective video quality.

Meanwhile, for example, deblocking filtering may be performed on an edge of the current chroma block. For example, a specific value may be derived based on the chroma QP of the current chroma block and a chroma QP of a neighboring block of the current chroma block adjacent to the edge, and a deblocking parameter for the deblocking filtering may be derived based on the specific value. For example, the specific value may be derived as in Equation 6 described above. The chroma QP of the current chroma block may be derived based on the CU chroma QP offset for the current chroma block as described above, and the chroma QP of the neighboring block may be derived based on a CU chroma QP offset for the neighboring block. Here, for example, the edge may represent an area of the current chroma block to which the deblocking filtering is applied.

Alternatively, for example, a specific value may be derived based on the chroma QP of the current chroma block, a chroma QP of a neighboring block of the current chroma block adjacent to the edge, and on the CU chroma QP offset, and the deblocking parameter for the deblocking filtering may be derived based on the specific value. For example, the specific value may be derived as in Equation 7 described above. Here, for example, the edge may represent an area of the current chroma block to which the deblocking filtering is applied.

The encoding apparatus encodes image information (S1420). The encoding apparatus may encode image information. The image information may include prediction information, residual information and/or chroma Quantization Parameter (QP) offset related information for the current chroma block For example, the encoding apparatus may generate and encode prediction information for the current chroma block. In this case, various prediction methods disclosed in this document, such as inter prediction or intra prediction, may be applied. For example, the encoding apparatus may determine whether to perform inter prediction or intra prediction on the current chroma block, and may determine specific inter prediction mode or specific intra prediction mode based on RD cost. According to the determined mode, the encoding apparatus may derive prediction samples for the current chroma block. The prediction information may include prediction mode information for the current chroma block. The image information may include the prediction information.

In addition, for example, the encoding apparatus may generate and encode Coding Unit (CU) chroma Quantization Parameter (QP) offset related information for the current chroma block based on a size and a tree type of the current chroma block. The CU chroma QP offset related information may be referred to as CU level chroma QP offset related information. Here, the tree type may be one of a single tree, a dual tree luma, and a dual tree chroma. Additionally, for example, the CU chroma QP offset related information may be signaled as a transform unit syntax for a first transform block among transform blocks of the current chroma block. That is, for example, the transform unit syntax for the first transform block may include the CU chroma QP offset related information. The first transform block may be a transform block among the transform blocks of the current chroma block, which is coded first in decoding order. For example, the first transform block may be a top-left transform block among the transform blocks of the current chroma block.

Specifically, for example, when at least one of the width and height of the current chroma block is greater than a specific value, the CU chroma QP offset related information for the current chroma block may be signaled. That is, for example, when at least one of the width and height of the current chroma block is greater than a specific value, the CU chroma QP offset related information for the current chroma block may be generated. In this connection, for example, the specific value may be 64. Additionally, for example, the transform unit syntax for the first transform block may include the CU chroma QP offset related information for the current chroma block. For example, when at least one of the width and height of the current chroma block is greater than the specific value, the CU chroma QP offset related information for the current chroma block may be signaled in the transform unit syntax for the first transform block regardless of whether or not the first transform block includes at least one non-zero transform coefficient level. That is, for example, when at least one of the width and height of the current chroma block is greater than the specific value, the transform unit syntax for the first transform block may include the CU chroma QP offset related information for the current chroma block regardless of whether or not the first transform block includes at least one non-zero transform coefficient level.

Alternatively, for example, when the tree type is the dual tree luma, the CU chroma QP offset related information for the current chroma block may not be signaled. That is, for example, when the tree type is the dual tree luma, the CU chroma QP offset related information for the current chroma block may not be generated. Thus, for example, when the tree type is not the dual tree luma (that is, when the tree type is one of single tree and dual tree chroma), the CU chroma QP offset related information for the current chroma block may be signaled. That is, for example, when the tree type is not the dual tree luma (that is, when the tree type is one of single tree and dual tree chroma), the CU chroma QP offset related information for the current chroma block may be generated. In this connection, for example, the transform unit syntax for the first transform block may include the CU chroma QP offset related information for the current chroma block. For example, when the tree type is not the dual tree luma (that is, when the tree type is one of single tree and dual tree chroma), the CU chroma QP offset related information for the current chroma block may be signaled through the transform unit syntax for the first transform block regardless of whether or not the first transform block includes at least one non-zero transform coefficient level. That is, for example, when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Alternatively, for example, when at least one of the width and height of the current chroma block is greater than a specific value, and when the tree type is not the dual tree luma (that is, when the tree type is one of single tree and dual tree chroma), the CU chroma QP offset related information for the current chroma block may be signaled. That is, for example, when at least one of the width and height of the current chroma block is greater than a specific value, and when the tree type is not the dual tree luma (that is, when the tree type is one of single tree and dual tree chroma), the CU chroma QP offset related information for the current chroma block may be generated. In this connection, for example, the specific value may be 64. Accordingly, for example, when the tree type is the dual tree luma, the CU chroma QP offset related information for the current chroma block may not be signaled. Additionally, for example, the transform unit syntax for the first transform block may include the CU chroma QP offset related information for the current chroma block. For example, when at least one of the width and height of the current chroma block is greater than the specific value, and when the tree type is not the dual tree luma (that is, when the tree type is one of single tree and dual tree chroma), the CU chroma QP offset related information for the current chroma block may be signaled through the transform unit syntax for the first transform block regardless of whether or not the first transform block includes at least one non-zero transform coefficient level. That is, for example, when at least one of the width and height of the current chroma block is greater than the specific value, and when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Meanwhile, for example, the CU chroma QP offset related information may include a CU chroma QP offset index and/or a CU chroma QP offset flag for the current chroma block. The CU chroma QP offset flag may also be referred to as a CU level chroma QP offset flag, and the CU chroma QP offset index may also be referred to as a CU level chroma QP offset index.

For example, the CU chroma QP offset flag may be a flag for whether or not an entry in the CU QP offset list for the chroma component is used to determine the value of the CU chroma QP offset. That is, for example, the CU chroma QP offset flag may represent whether or not an entry in the CU QP offset list for the chroma component is used to determine the value of the CU chroma QP offset. For example, when the CU chroma QP offset flag is present, and when the value of the CU chroma QP offset flag is 1, the CU chroma QP offset flag may represent that an entry in a CU QP offset list for a chroma component is used to determine the value of the CU chroma QP offset. Also, for example, when the value of the CU chroma QP offset flag is 0, the CU chroma QP offset flag may represent that the CU QP offset list for the chroma component is not used to determine the value of the CU chroma QP offset. Here, for example, the chroma component may include a Cb component, a Cr component, and/or a joint CbCr component. Additionally, for example, the syntax element of the CU chroma QP offset flag may be the above-described cu_chroma_qp_offset_flag.

In addition, for example, the CU chroma QP offset index may represent an index of an entry in a CU QP offset list used to determine a value of the CU chroma QP offset. That is, for example, the CU chroma QP offset index may be information about an index of an entry in the CU QP offset list. Further, for example, the syntax element of the CU chroma QP offset index may be the above-described cu_chroma_qp_offset_idx.

In addition, for example, the encoding apparatus may derive the chroma QP for the current chroma block based on the CU chroma QP offset related information. For example, the encoding apparatus may derive a CU chroma QP offset for the current chroma block based on the CU chroma QP offset related information, and may derive the chroma QP for the current chroma block based on the CU chroma QP offset. Specifically, for example, the encoding apparatus may derive the chroma QP for the current chroma block through addition of the CU chroma QP offset and the first chroma QP for the chroma component.

Specifically, for example, the encoding apparatus may derive the first chroma QP for the chroma component of the current chroma block based on the luma QP and/or chroma QP mapping table, may derive the CU chroma QP offset for the chroma block based on the CU chroma QP offset related information, and may derive the chroma QP for the current chroma block based on the first chroma QP and the CU chroma QP offset. Here, for example, the first chroma QP may be referred to as a sequence parameter set (SPS) chroma QP or an SPS level chroma QP.

Then, for example, the encoding apparatus may derive transform coefficients for the current chroma block by quantizing the residual samples based on the chroma QP. The encoding apparatus may derive transform coefficients for the current chroma block based on the chroma QP. For example, the encoding apparatus may derive the transform coefficients by quantizing the residual samples for the current chroma block based on the chroma QP. Alternatively, for example, the encoding apparatus may derive transform coefficients which have been transformed by transforming the residual samples for the current chroma block, and may derive the transform coefficients by quantizing the transformed transform coefficients based on the chroma QP.

In addition, for example, the encoding apparatus may generate and encode residual information for the current chroma block. For example, the encoding apparatus may generate and encode residual information for the transform coefficients. For example, the residual information may include sign flag information and transform coefficient level information for the transform coefficients. For example, the transform coefficient level of the transform coefficient may be derived as a value represented by transform coefficient level information included in the residual information, and the sign of the transform coefficient may be derived as a sign represented by the sign flag information. For example, the residual information may include syntax elements for transform coefficients of a current chroma block. For example, the syntax elements may include syntax elements such as coded_sub_block_flag, sig_coeff_flag, coeff_sign_flag, abs_level_gt1_flag, par_level_flag, abs_level_gtX_flag, abs_remainder, coeff_sign_flag and/or like.

For example, the encoding apparatus may encode image information and output it in the form of a bitstream.

Meanwhile, the bit stream including the image information may be transmitted to the decoding apparatus over a network or a (digital) storage medium. In this case, the network may include a broadcasting network and/or a communication network. The digital storage medium may include various storage media, such as a USB, an SD, a CD, a DVD, Blu-ray, an HDD, and an SSD.

Figure 15:
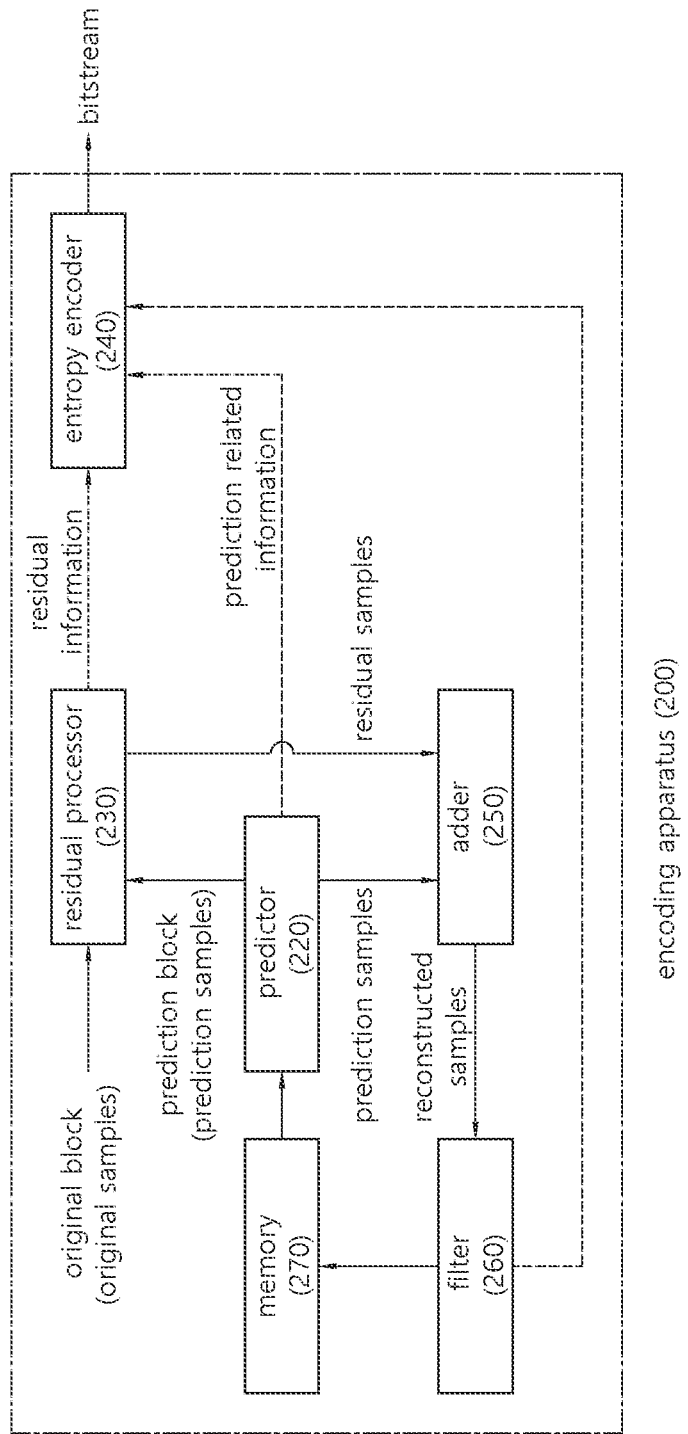
FIG. 15 schematically shows an encoding apparatus for performing an image encoding method according to this document.

FIG. 15 schematically shows an encoding apparatus for performing an image encoding method according to this document. The method disclosed in FIG. 14 may be performed by the encoding apparatus disclosed in FIG. 15. Specifically, for example, the predictor and the residual processor of the encoding apparatus of FIG. 15 may perform S1400, the adder of the encoding apparatus of FIG. 15 may perform S1410, and the entropy encoder of the encoding apparatus of FIG. 15 may perform S1420.

Figure 16:
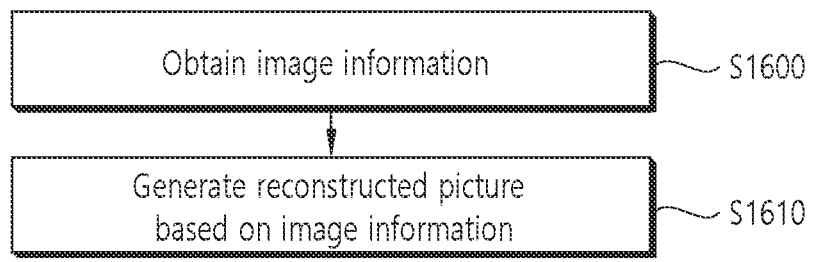
FIG. 16 schematically shows an image decoding method by a decoding apparatus according to this document.

FIG. 16 schematically shows an image decoding method by a decoding apparatus according to this document. The method disclosed in FIG. 16 may be performed by the decoding apparatus disclosed in FIG. 3. Specifically, for example, S1600 of FIG. 16 may be performed by an entropy decoder of the decoding apparatus; S1610 of FIG. 16 may be performed by a residual processor of the decoding apparatus.

The decoding apparatus obtains image information through a bitstream (S1600). The decoding apparatus may obtain image information through a bitstream.

For example, the image information may include prediction information and/or residual information for a current chroma block. For example, the decoding apparatus may obtain prediction information and/or residual information for a current chroma block.

For example, the prediction information may include prediction mode information for the current chroma block. The prediction mode information may represent whether inter prediction or intra prediction is applied to the current block for the chroma components.

In addition, for example, the residual information may include syntax elements for transform coefficients of the current chroma block. For example, the syntax elements may include syntax elements such as coded_sub_block_flag, sig_coeff_flag, coeff_sign_flag, abs_level_gt1_flag, par_level_flag, abs_level_gtX_flag, abs_remainder, coeff_sign_flag and/or like.

In addition, for example, the image information may Coding Unit (CU) chroma Quantization Parameter (QP) offset related information for the current chroma block. For example, the decoding apparatus may obtain Coding Unit (CU) chroma quantization parameter (QP) offset related information for the current chroma block based on a size and a tree type of the current chroma block. The CU chroma QP offset related information may be referred to as CU level chroma QP offset related information. Here, the tree type may be one of a single tree, a dual tree luma, and a dual tree chroma. Additionally, for example, the CU chroma QP offset related information may be signaled as a transform unit syntax for a first transform block among transform blocks of the current chroma block. That is, for example, the transform unit syntax for the first transform block may include the CU chroma QP offset related information. The first transform block may be a transform block among the transform blocks of the current chroma block, which is decoded first in decoding order. For example, the first transform block may be a top-left transform block among the transform blocks of the current chroma block.

Specifically, for example, when at least one of the width and height of the current chroma block is greater than a specific value, the CU chroma QP offset related information for the current chroma block may be signaled. That is, for example, when at least one of the width and height of the current chroma block is greater than a specific value, the CU chroma QP offset related information for the current chroma block may be obtained. In this connection, for example, the specific value may be 64. Additionally, for example, the transform unit syntax for the first transform block may include the CU chroma QP offset related information for the current chroma block. For example, when at least one of the width and height of the current chroma block is greater than the specific value, the CU chroma QP offset related information for the current chroma block may be obtained as the transform unit syntax for the first transform block regardless of whether or not the first transform block includes at least one non-zero transform coefficient level. That is, for example, when at least one of the width and height of the current chroma block is greater than the specific value, the transform unit syntax for the first transform block may include the CU chroma QP offset related information for the current chroma block regardless of whether or not the first transform block includes at least one non-zero transform coefficient level.

Alternatively, for example, when the tree type is the dual tree luma, the CU chroma QP offset related information for the current chroma block may not be signaled. That is, for example, when the tree type is the dual tree luma, the CU chroma QP offset related information for the current chroma block may not be obtained. Thus, for example, when the tree type is not the dual tree luma (that is, when the tree type is one of single tree and dual tree chroma), the CU chroma QP offset related information for the current chroma block may be signaled. That is, for example, when the tree type is not the dual tree luma (that is, when the tree type is one of single tree and dual tree chroma), the CU chroma QP offset related information for the current chroma block may be obtained. In this connection, for example, the transform unit syntax for the first transform block may include the CU chroma QP offset related information for the current chroma block. For example, when the tree type is not the dual tree luma (that is, when the tree type is one of single tree and dual tree chroma), the CU chroma QP offset related information for the current chroma block may be obtained through the transform unit syntax for the first transform block regardless of whether or not the first transform block includes at least one non-zero transform coefficient level. That is, for example, when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Alternatively, for example, when at least one of the width and height of the current chroma block is greater than a specific value, and when the tree type is not the dual tree luma (that is, when the tree type is one of single tree and dual tree chroma), the CU chroma QP offset related information for the current chroma block may be signaled. That is, for example, when at least one of the width and height of the current chroma block is greater than a specific value, and when the tree type is not the dual tree luma (that is, when the tree type is one of single tree and dual tree chroma), the CU chroma QP offset related information for the current chroma block may be obtained. In this connection, for example, the specific value may be 64. Accordingly, for example, when the tree type is the dual tree luma, the CU chroma QP offset related information for the current chroma block may not be signaled. Additionally, for example, the transform unit syntax for the first transform block may include the CU chroma QP offset related information for the current chroma block. For example, when at least one of the width and height of the current chroma block is greater than the specific value, and when the tree type is not the dual tree luma (that is, when the tree type is one of single tree and dual tree chroma), the CU chroma QP offset related information for the current chroma block may be obtained through the transform unit syntax for the first transform block regardless of whether or not the first transform block includes at least one non-zero transform coefficient level. That is, for example, when at least one of the width and height of the current chroma block is greater than the specific value, and when the tree type is not the dual tree luma (that is, when the tree type is one of single tree and dual tree chroma), the transform unit syntax for the first transform block may include the CU chroma QP offset related information for the current chroma block regardless of whether or not the first transform block includes at least one non-zero transform coefficient level.

Meanwhile, for example, the CU chroma QP offset related information may include a CU chroma QP offset index and/or a CU chroma QP offset flag for the current chroma block. The CU chroma QP offset flag may also be referred to as a CU level chroma QP offset flag, and the CU chroma QP offset index may also be referred to as a CU level chroma QP offset index.

For example, the CU chroma QP offset flag may be a flag for whether or not an entry in the CU QP offset list for the chroma component is used to determine the value of the CU chroma QP offset. That is, for example, the CU chroma QP offset flag may represent whether or not an entry in the CU QP offset list for the chroma component is used to determine the value of the CU chroma QP offset. For example, when the CU chroma QP offset flag is present, and when the value of the CU chroma QP offset flag is 1, the CU chroma QP offset flag may represent that an entry in a CU QP offset list for a chroma component is used to determine the value of the CU chroma QP offset. Also, for example, when the value of the CU chroma QP offset flag is 0, the CU chroma QP offset flag may represent that the CU QP offset list for the chroma component is not used to determine the value of the CU chroma QP offset. Here, for example, the chroma component may include a Cb component, a Cr component, and/or a joint CbCr component. Additionally, for example, the syntax element of the CU chroma QP offset flag may be the above-described cu_chroma_qp_offset_flag.

In addition, for example, the CU chroma QP offset index may represent an index of an entry in a CU QP offset list used to determine a value of the CU chroma QP offset. That is, for example, the CU chroma QP offset index may be information about an index of an entry in the CU QP offset list. Further, for example, the syntax element of the CU chroma QP offset index may be the above-described cu_chroma_qp_offset_idx.

The decoding apparatus generates a reconstructed picture based on the image information (S1610). For example, the decoding apparatus may derive prediction samples and residual samples for the current chroma block, and generate reconstructed samples and/or a reconstructed picture based on the prediction samples and the residual samples.

For example, the decoding apparatus may derive prediction samples by performing an inter prediction mode or an intra prediction mode for the current chroma block based on the prediction information.

In addition, for example, the decoding apparatus may derive transform coefficients of the current chroma block based on the residual information. The residual information may include sign flag information and transform coefficient level information for the transform coefficients.

For example, the transform coefficient level of the transform coefficient may be derived as a value represented by transform coefficient level information included in the residual information, and the sign of the transform coefficient may be derived as a sign represented by the sign flag information.

Then, for example, the decoding apparatus may derive the chroma QP for the current chroma block based on the CU chroma QP offset related information. For example, the decoding apparatus may derive a CU chroma QP offset for the current chroma block based on the CU chroma QP offset related information, and may derive the chroma QP for the current chroma block based on the CU chroma QP offset. Specifically, for example, the decoding apparatus may derive the chroma QP for the current chroma block through addition of the CU chroma QP offset and the first chroma QP for the chroma component.

Specifically, for example, the decoding apparatus may derive the first chroma QP for the chroma component of the current chroma block based on the luma QP and/or chroma QP mapping table, may derive the CU chroma QP offset for the current chroma block based on the CU chroma QP offset related information, and may derive the chroma QP for the current chroma block based on the first chroma QP and the CU chroma QP offset. Here, for example, the first chroma QP may be referred to as a sequence parameter set (SPS) chroma QP or an SPS level chroma QP.

Then, for example, the decoding apparatus may derive residual samples for the current chroma block by dequantizing the transform coefficients based on the chroma QP. The decoding apparatus may derive residual samples for the current chroma block based on the chroma QP. For example, the decoding apparatus may derive the residual samples by dequantizing the transform coefficients for the current chroma block based on the chroma QP. Alternatively, for example, the decoding apparatus may derive inverse transformed transform coefficients by inverse transforming the transform coefficients for the current chroma block, and may derive the residual samples by dequantizing the inverse transformed transform coefficients based on the chroma QP.

Then, for example, the decoding apparatus may generate the reconstructed picture based on the prediction samples and the residual samples. For example, the decoding apparatus may generate reconstructed samples and/or a reconstructed picture through addition of the prediction samples and the residual samples.

After this, as described above, an in-loop filtering procedure such as an ALF procedure, SAO and/or deblocking filtering may be applied as needed to the reconstructed samples in order to improve subjective/objective video quality.

Meanwhile, for example, deblocking filtering may be performed on an edge of the current chroma block. For example, a specific value may be derived based on the chroma QP of the current chroma block and a chroma QP of a neighboring block of the current chroma block adjacent to the edge, and the deblocking parameter for the deblocking filtering may be derived based on the specific value. For example, the specific value may be derived as in Equation 6 described above. The chroma QP of the current chroma block may be derived based on the CU chroma QP offset for the current chroma block as described above, and the chroma QP of the neighboring block may be derived based on a CU chroma QP offset for the neighboring block. Here, for example, the edge may represent an area of the current chroma block to which the deblocking filtering is applied.

Alternatively, for example, a specific value may be derived based on the chroma QP of the current chroma block, a chroma QP of a neighboring block of the current chroma block adjacent to the edge, and on the CU chroma QP offset, and the deblocking parameter for the deblocking filtering may be derived based on the specific value. For example, the specific value may be derived as in Equation 7 described above. Here, for example, the edge may represent an area of the current chroma block to which the deblocking filtering is applied.

Figure 17:
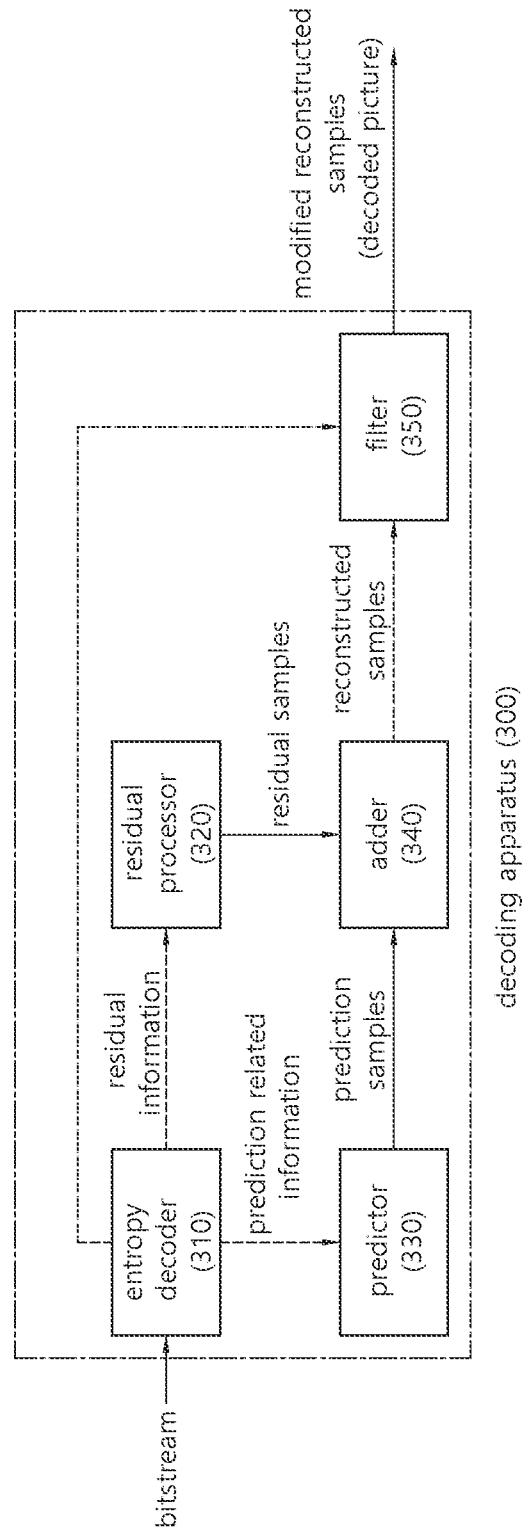
FIG. 17 schematically shows a decoding apparatus for performing an image decoding method according to this document.

FIG. 17 schematically shows a decoding apparatus for performing an image decoding method according to this document. The method disclosed in FIG. 16 may be performed by the decoding apparatus disclosed in FIG. 17. Specifically, for example, the entropy decoder of the decoding apparatus of FIG. 17 may perform S1600 of FIG. 16; and the residual processor of the decoding apparatus of FIG. 17 may perform S1610 of FIG. 16.

According to this document described above, even if the first transform block in the current chroma block does not include a non-zero transform coefficient level, and when at least one of the width and height of the current chroma block is greater than a specific size, information on the CU chroma QP offset can be signaled, and, thereby, it is possible to reduce the cost of configuring the decoding apparatus.

Further, according to this document, even if the first transform block in the current chroma block does not include a non-zero transform coefficient level, information about the CU chroma QP offset may be signaled in the transform unit syntax of the first transform block based on the size and tree type of the current chroma block, and, thereby, it is possible to reduce the buffer requirement of the decoding apparatus and to reduce the cost of configuring the decoding apparatus.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

FIG. 18 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
   obtaining image information; and
   generating a reconstructed picture based on the image information, wherein the obtaining the image information comprises:
obtaining prediction information and residual information for a chroma component of a current coding unit; and
obtaining Coding Unit (CU) chroma Quantization Parameter (QP) offset related information for the current coding unit based on a tree type and a size of the current coding unit,
wherein the CU chroma QP offset related information includes a CU chroma QP offset flag and a CU chroma QP offset index for the current coding unit, and
wherein, based on at least one of a width and a height of the current coding unit being greater than 64 and the tree type not being a dual tree luma, the CU chroma QP offset related information is obtained.

2. An image encoding method, performed by an encoding apparatus, comprising:
deriving prediction samples and residual samples for a chroma component of a current coding unit;
generating a reconstructed picture based on the prediction samples and the residual samples; and
encoding image information,
wherein the encoding the image information comprises:
generating prediction information for the current coding unit;
deriving a chroma Quantization Parameter (QP) for the current coding unit;
deriving transform coefficients for the current coding unit chroma block-by quantizing the residual samples based on the chroma QP;
generating residual information for the transform coefficients;
generating Coding Unit (CU) chroma QP offset related information for the chroma QP based on a tree type and a size of the current coding unit; and
encoding image information including the CU chroma QP offset related information, the prediction information, and the residual information,
wherein the CU chroma QP offset related information includes a CU chroma QP offset flag and a CU chroma QP offset index for the current coding unit, and
wherein, based on at least one of a width and a height of the current coding unit being greater than 64 and the tree type not being a dual tree luma, the CU chroma QP offset related information is signaled.

3. A non-transitory computer-readable storage medium storing a bitstream generated by a method, the method comprising:
deriving prediction samples and residual samples for a chroma component of a current coding unit;
generating a reconstructed picture based on the prediction samples and the residual samples;
encoding image information; and
generating the bitstream including the image information,
wherein the encoding the image information comprises:
generating prediction information for the current coding unit;
deriving a chroma Quantization Parameter (QP) for the current coding unit;
deriving transform coefficients for the current coding unit by quantizing the residual samples based on the chroma QP;
generating residual information for the transform coefficients;
generating Coding Unit (CU) chroma QP offset related information for the chroma QP based on a tree type and a size of the current coding unit; and
encoding image information including the CU chroma QP offset related information, the prediction information, and the residual information,
wherein the CU chroma QP offset related information includes a CU chroma QP offset flag and a CU chroma QP offset index for the current coding unit, and
wherein, based on at least one of a width and a height of the current coding unit being greater than 64 and the tree type not being a dual tree luma, the CU chroma QP offset related information is signaled.

4. A transmission method of data for image, the method comprising:
obtaining a bitstream of image information including Coding Unit (CU) chroma Quantization Parameter (QP) offset related information, prediction information and residual information for a chroma component of a current coding unit; and
transmitting the data including the bitstream of the image information including the CU chroma QP offset related information, the prediction information, and the residual information,
wherein prediction samples for the current coding unit are derived based on the prediction information,
wherein residual samples for the current coding unit are derived based on the residual information,
wherein the CU chroma QP offset related information for a chroma QP for the current coding unit is generated based on a tree type and a size of the current coding unit chroma block,
wherein the CU chroma QP offset related information includes a CU chroma QP offset flag and a CU chroma QP offset index for the current coding unit, and
wherein, based on at least one of a width and a height of the current coding unit being greater than 64 and the tree type not being a dual tree luma, the CU chroma QP offset related information is signaled.

* * * * *

UNITED STATES PATENT AND TRADEMARK OFFICE
CERTIFICATE OF CORRECTION

PATENT NO. : 12,075,050 B2
APPLICATION NO. : 17/629597
DATED : August 27, 2024
INVENTOR(S) : Jie Zhao, Seethal Paluri and Seunghwan Kim It is certified that error appears in the above-identified patent and that said Letters Patent is hereby corrected as shown below:

In the Claims

Column 53, Line 29; In Claim 2, after "unit" delete "chroma block-".

Column 54, Lines 43-44; In Claim 4, after "coding unit" delete "chroma block".

Signed and Sealed this
Fifth Day of November, 2024

Katherine Kelly Vidal
*Director of the United States Patent and Trademark Office*